(12) United States Patent
Kishi et al.

(10) Patent No.: US 9,767,124 B2
(45) Date of Patent: Sep. 19, 2017

(54) INFORMATION PROCESSING SYSTEM AND INFORMATION PROCESSING METHOD

(71) Applicants: Hidenobu Kishi, Kanagawa (JP); Nobuyuki Kishi, Tokyo (JP)

(72) Inventors: Hidenobu Kishi, Kanagawa (JP); Nobuyuki Kishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/180,938

(22) Filed: Jun. 13, 2016

(65) Prior Publication Data

US 2016/0321303 A1 Nov. 3, 2016

Related U.S. Application Data

(63) Continuation of application No. 14/293,370, filed on Jun. 2, 2014, now Pat. No. 9,402,013.

(30) Foreign Application Priority Data

Jun. 7, 2013 (JP) ................................ 2013-121334

(51) Int. Cl.
*H04N 1/00* (2006.01)
*G06F 17/30* (2006.01)
(Continued)

(52) U.S. Cl.
CPC .. *G06F 17/30277* (2013.01); *G06F 17/30864* (2013.01); *H04N 1/00244* (2013.01);
(Continued)

(58) Field of Classification Search
CPC ........ G06F 17/30277; G06F 17/30864; H04N 1/2129; H04N 5/23222
See application file for complete search history.

(56) References Cited

U.S. PATENT DOCUMENTS

2006/0002607 A1 1/2006 Boncyk et al.
2008/0279481 A1* 11/2008 Ando ................ G06F 17/30277
382/306
(Continued)

FOREIGN PATENT DOCUMENTS

EP 2 302 537 A1 3/2011
JP 2003-331177 A 11/2003
(Continued)

OTHER PUBLICATIONS

Jonathan J. Hull, et al., "Mixed Media Reality (MMR): A New Method of eP-Fusion", Ricoh Technical Report, No. 33, Dec. 2007, pp. 119-125 http://www.ricoh.co.jp/about/company/technology/techreport/33/pdf/A3314.pdf (accessed May 27, 2013).
(Continued)

*Primary Examiner* — Amy Hsu
(74) *Attorney, Agent, or Firm* — Oblon, McClelland, Maier & Neustadt, L.L.P.

(57) ABSTRACT

An information processing system comprises a terminal device and an image search system that are connected to each other via a network, the image search system comprises: a storage unit storing an object and linkage information; a first receiver receiving a captured image; and a first transmitter transmitting the linkage information associated with the object to a source from which the captured image is transmitted, and the terminal device comprises: an identification information acquisition unit acquiring identification information that identifies each terminal device; an image capturing unit capturing an image of a subject and output the captured image; a second transmitter transmitting the captured image to the image search system; a second receiver receiving the linkage information; and a third transmitter transmitting, when an access is made via the network on the basis of the linkage information, the iden-
(Continued)

tification information to an access destination to which the access is made.

18 Claims, 18 Drawing Sheets

(51) Int. Cl.
*H04N 1/21* (2006.01)
*H04N 5/232* (2006.01)
(52) U.S. Cl.
CPC ....... *H04N 1/2129* (2013.01); *H04N 5/23222* (2013.01); *H04N 2201/0084* (2013.01)

(56) References Cited

U.S. PATENT DOCUMENTS

| | | | |
|---|---|---|---|
| 2010/0034468 A1* | 2/2010 | Boncyk | G06F 17/30247 382/217 |
| 2011/0078553 A1* | 3/2011 | Reimann | G06F 17/30876 715/234 |
| 2011/0292204 A1 | 12/2011 | Boncyk et al. | |
| 2011/0295714 A1 | 12/2011 | Boncyk et al. | |
| 2011/0295742 A1 | 12/2011 | Boncyk et al. | |
| 2011/0295829 A1 | 12/2011 | Boncyk et al. | |
| 2012/0057032 A1* | 3/2012 | Jang | G06K 9/228 348/207.1 |
| 2013/0083207 A1 | 4/2013 | Boncyk et al. | |
| 2013/0094708 A1* | 4/2013 | Boncyk | G06F 17/30247 382/103 |
| 2013/0230210 A1 | 9/2013 | Boncyk et al. | |
| 2013/0246256 A1 | 9/2013 | Boncyk et al. | |
| 2013/0293694 A1* | 11/2013 | Mizobe | H04N 7/183 348/77 |
| 2013/0332317 A1 | 12/2013 | Boncyk et al. | |
| 2013/0336533 A1 | 12/2013 | Boncyk et al. | |
| 2014/0006387 A1 | 1/2014 | Kishi et al. | |
| 2014/0006435 A1 | 1/2014 | Kishi et al. | |
| 2014/0012705 A1 | 1/2014 | Boncyk et al. | |
| 2014/0064561 A1 | 3/2014 | Boncyk et al. | |
| 2014/0133712 A1 | 5/2014 | Boncyk et al. | |
| 2014/0147006 A1 | 5/2014 | Boncyk et al. | |
| 2014/0172575 A1 | 6/2014 | Boncyk et al. | |
| 2014/0177916 A1 | 6/2014 | Boncyk et al. | |
| 2014/0177918 A1 | 6/2014 | Boncyk et al. | |
| 2014/0177922 A1 | 6/2014 | Boncyk et al. | |

FOREIGN PATENT DOCUMENTS

| | | |
|---|---|---|
| JP | 2005-107992 A | 4/2005 |
| JP | 2007-073063 A | 3/2007 |
| JP | WO 2010/016281 A1 | 2/2010 |
| JP | 2010-140250 A | 6/2010 |
| JP | 2012-173885 A | 9/2012 |
| JP | 2013-109499 A | 6/2013 |
| JP | 2014-010722 A | 1/2014 |
| JP | 2014-010723 A | 1/2014 |
| JP | 2014-182405 A | 9/2014 |
| JP | 2015-018405 A | 1/2015 |
| WO | WO 2013/080599 A1 | 9/2012 |
| WO | WO 2013/074750 A1 | 5/2013 |

OTHER PUBLICATIONS

Extended European Search Report issued Oct. 8, 2014 in Patent Application No. 14170957.6.
Office Action issued Feb. 28, 2017 in Japanese Patent Application No. 2013-121334.

* cited by examiner

FIG. 4A

| ID | INDEX DATA | 120 |
|---|---|---|
| aaa001 | (BINARY DATA) | |
| | | |
| | | |

FIG. 4B

| ID | TARGET REGION | 121 |
|---|---|---|
| aaa001 | (XML CODE/XML FILE NAME) | |
| | | |
| | | |

┌<hotspot>
     │   142 ──► <area>x1,y1,x2,y2</area>
     │          ┌<link>
     │          │          <title>****Shop Web Page</title>
     │    143₁ ┤          <type>info</type>
141₁ ┤          │          <URI>http://1.example.org/index.html</URI>
     │          └</link>
     │          ┌<link>
     │    143₂ ┤   :
     │          └</link>
     └</hotspot>
     ┌<hotspot>
141₂ ┤   :
     └</hotspot>

| APPLICATION ID | ACCESS DATE | OBJECT ID | DEVICE INFORMATION |
|---|---|---|---|
| 1001 | 2013/5/23 13:30:00 | aaa001 | Dev01 |
| 2011 | 2013/5/23 14:00:00 | aab021 | Dev02 |
| 1001 | 2013/5/24 05:01:30 | ccc001 | Dev01 |
| 1003 | 2013/5/24 12:00:00 | ddd002 | Dev04 |
| ... | ... | ... | ... |

FIG.17

| CUSTOMER ID | |
|---|---|
| OBJECT ID | LINK |
| aaa001 | http://1.exsample.org/001.html |
| aab021 | http://2.exsample.org/001.html |
| ccc001 | http://3.exsample.org/001.html |
| ddd002 | http://4.exsample.org/001.html |
| ... | ... |

FIG.19

| LEARNING MATERIAL || LINK |
| CLASS | LEVEL | |
|---|---|---|
| BEGINNER | A | URL#1A |
| | B | URL#1B |
| | C | URL#1C |
| INTERMEDIATE | A | URL#2A |
| | B | ... |
| | C | |
| | D | |
| ADVANCED | A | ... |
| | B | |
| | ... | |

INFORMATION PROCESSING SYSTEM AND INFORMATION PROCESSING METHOD

CROSS-REFERENCE TO RELATED APPLICATIONS

This is a continuation of U.S. patent application Ser. No. 14/293,370, filed Jun. 2, 2014, which claims priority to Japanese Patent Application No. 2013-121334 filed in Japan on Jun. 7, 2013. The entire content of U.S. patent application Ser. No. 14/293,370 is incorporated herein by reference.

BACKGROUND OF THE INVENTION

1. Field of the Invention

The present invention relates to an image processing system and an information processing method that provide information according to an image.

2. Description of the Related Art

Information is provided via various media and various technologies for efficiently providing such information have been proposed. For example, an information provision management system for providing useful support information to users by using image processing technology and mobile phone has been proposed (see Japanese Patent Application Laid-open No. 2005-107992).

The support information provision system disclosed in Japanese Patent Application Laid-open No. 2005-107992 includes a management computer, a parts image data storage unit, and a help data storage unit. With a mobile phone, a user captures an image of part of a copier for which help information is requested. The mobile phone transmits a help request including the captured image data to the support information provision system. The management computer specifies parts image data that is recorded in the parts image data storage unit on the basis of the device type identifier and captured image data that are included in the help request. The management computer extracts the support information and transmits help screen data to the mobile phone.

For image search technology, mixed media reality (MMR) technology for associating paper image information and electronic information with each other is proposed (see Mixed Media Reality (MMR): A New Method of eP-Fusion. Ricoh Technical Report No. 33 DECEMBER, 2007. URL: http://www.ricoh.co.jp/about/company/technology/techreport/33/pdf/A3314.pdf, (accessed 2013-05-27)).

The MMR technology disclosed in Mixed Media Reality (MMR): A New Method of eP-Fusion is aimed at linking paper documents to electronic information. With the MMR technology, no change is required in the look or format of paper documents and each link can be specified on a print via a mobile phone with camera. Particularly, even when optical character recognition (OCR) is difficult to perform for an image with texts, the MMR technology allows specifying of an original image by using the disposition (pitch, positional relationship, etc.) of a partial text image of the text document.

Another technology for implementing high-speed search has been also proposed (see Japanese Patent Application Laid-open No. 2007-073063). The technology disclosed in Japanese Patent Application Laid-open No. 2007-073063 allows high-speed search with dynamic object insertion. Space data is registered and an M-tree space indices in a tree structure is previously generated for the registered space data and space data similar to the space data specified by the user is searched with the space indices. In this case, the region of each node constituting the tree structure of the space indices includes all of the space data lower than the node so that overlapping between node regions is deleted, thereby high-speed search is implemented.

Electronic information is suitable to be processed or saved. On the other hand, information dissemination by presenting images to users, e.g. information dissemination via paper media, such as newspapers, is used in various scenes. For example, there are various information dissemination media for disseminating information to users, such as poster and electronic bulletin board in places where the general public come and go, e.g. streets and public facilities, and poster and electronic bulletin board on the wall of tower buildings. With such technology for linking information dissemination media and electronic information, usefulness for users is expected to increase. Use of paper media on which two-dimensional code with embedded Internet link information, which is electronic information, is printed is an example where paper media and electronic information are linked with each other.

However, printing of paper media, such as newspapers, has a problem in that there is a significant time limitation because time is required to determine articles and a layout and then to print paper media. Furthermore, there is also a problem in that the link is often required to be changed according to the circumstance and, each time when the link is changed, the link on the information dissemination medium, such as paper media and electronic media, has to be changed as well, which may be time-consuming and increase the cost.

Furthermore, searching electronic information with texts requires preparation of text information indices, which is time-consuming.

In order to store information of paper media, conventionally, desired articles are cut out of, for example, newspapers and the articles are attached to a scrap note, etc. However, such a work is time-consuming and furthermore causes an inconvenience in that the articles on the back side cannot be read. Alternatively, newspaper articles may be scanned and the information may be saved as image data. However, this case also has a problem in that it requires operations such as scanning and saving and also requires a time for extracting and processing only desired articles.

In view of the above circumstances, there is a need to allow easy provision of electronic information according to a presented image.

SUMMARY OF THE INVENTION

It is an object of the present invention to at least partially solve the problems in the conventional technology.

According to the present invention, there is provided an information processing system comprising a terminal device and an image search system that is configured with at least one information processing device, the terminal device and the image search system communicably connected to each other via a network, wherein the image search system comprises: a storage unit configured to store an object and linkage information in association with each other; a first receiver configured to receive a captured image; and a first transmitter configured to transmit, on the basis of an object included in the captured image, the linkage information associated with the object to a source from which the captured image is transmitted, and the terminal device comprises: an identification information acquisition unit configured to acquire identification information that identifies each terminal device that uses the image search system; an image capturing unit configured to capture an image of a subject and output the captured image; a second transmitter configured to transmit the captured image, which is output by the image capturing unit, to the image search system; a second receiver configured to receive the linkage information that is transmitted from the image search system in response to the transmission of the captured image by the second transmitter; and a third transmitter configured to transmit, when an access is made via the network on the basis of the linkage information received by the second receiver, the identification information to an access destination to which the access is made.

The present invention also provides an information processing method comprising: acquiring identification information that is information that identifies each terminal device; first transmitting a captured image obtained by capturing an image of a subject; second transmitting linkage information that is associated with an object included in the captured image, which is transmitted by the first transmitting, from a storage unit that stores the object and the linkage information in association with each other; and when the linkage information transmitted by the second transmitting in response to the transmission of the captured image by the first transmitting is received and an access is made via a network on the basis of the linkage information, third transmitting the identification information to an access destination to which the access is made.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 4A and 4B are diagrams of exemplary configurations of a DB configuration according to the embodiment;

FIG. 5 is a diagram of an exemplary XML code according to the embodiment;

FIG. 16 is a diagram of an exemplary configuration of a log information table according to the third embodiment;

FIG. 17 is a diagram of an exemplary configuration of a linkage information table according to the third embodiment;

FIG. 19 is a diagram of exemplary grouping of member content according to a second application example of the third embodiment;

DETAILED DESCRIPTION OF THE PREFERRED EMBODIMENTS

Embodiments of an information processing system and an information processing method according to the present invention will be described in detail below with reference to the accompanying drawings.

Image Search System Applicable to Embodiments

Before the embodiments are described, an image search system applicable to the embodiments will be described for better understanding of the embodiments. The image search system extracts an object from an image that is captured by an image capturing device, compares the extracted object with objects that are previously stored in a database, and specifies an object with the highest similarity to the extracted object from among the objects stored in the database. Link information of commercial sites that is previously associated with the specified object, etc. is presented to the user.

Figure 1:
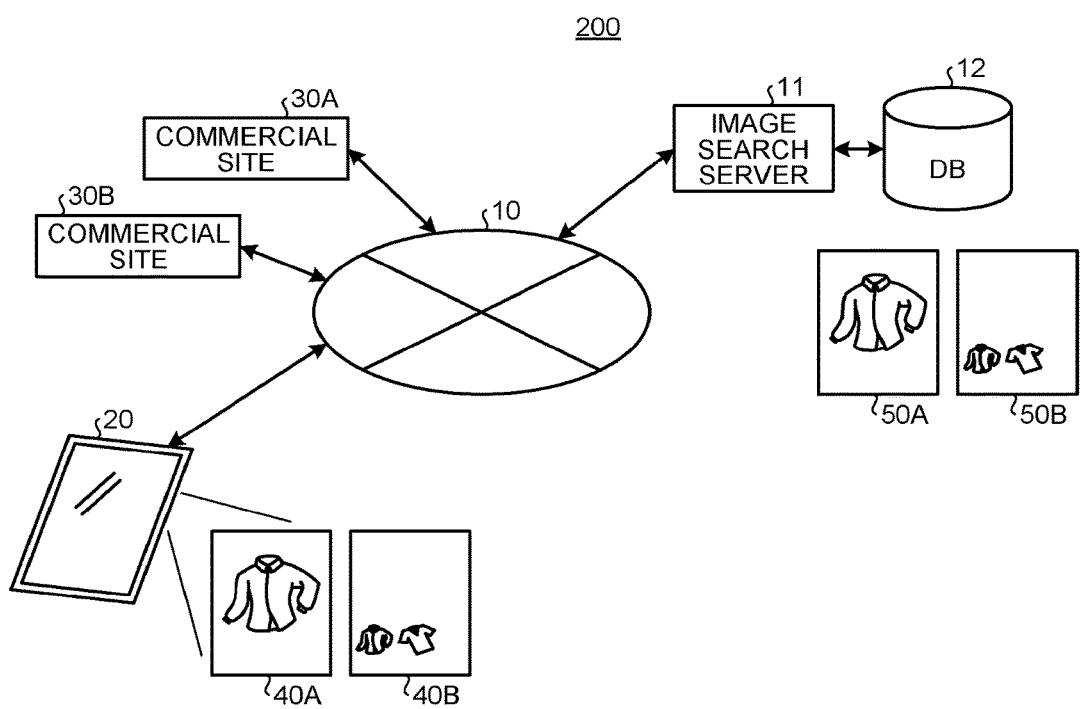
FIG. 1 is a diagram of an exemplary configuration of a search system according to an embodiment of the present invention.

FIG. 1 is illustrates an exemplary configuration of an image search system applicable to embodiments. In an image search system 200 shown in FIG. 2, an image search server 11 and a terminal device 20 are connected to a network 10. The network 10 is, for example, the Internet, and as a communication protocol thereof, TCP/IP (Transmission Control Protocol/Internet Protocol) is used. The network 10 includes multiple computers that are connected one another via the network. The network 10 may be a network cloud that is a network group serving as a black box which cannot be viewed from the outside and can be viewed in terms of only input and output.

Furthermore, multiple commercial sites 30A and 30B are connected to the network 10. The commercial sites 30A and 30B can send out items according to orders made via the network 10.

The terminal device 20 can have wired or wireless communications with the network 10. The terminal device 20 can perform operations according to instructions received via the network 10, can display images received via the network 10 on a user interface (UI) including a display device and an input device, and can transmit data to the network 10 according to user's operations on the UI.

The terminal device 20 has an image capturing function so as to capture an image of a subject in response to an image capturing instruction operation on the UI. The terminal device 20 can transmit the captured image to the network 10.

A database (DB) 12 is connected to the image search server 11. In accordance with a request that is received via the network 10, the image search server 11 can perform a process of searching the DB 12 according to the embodiment. In the embodiment, sets of index data respectively for searching image data 50A and image data 50B are stored in association with linkage information in the DB 12. Index data is data that is obtained by analyzing binary image data and is data obtained by converting the image data to a structure for searching.

Image data may be directly stored in the DB 12. The file name and pass of the image data may be stored in the DB 12.

The image search server 11 receives image data via the network 10, searches the DB 12 on the basis of the received image data, and acquires linkage information corresponding to the image data as a search result. The image search server 11 returns the linkage information, which is acquired as a search result, to the source from which the image data was transmitted.

Figure 2A:
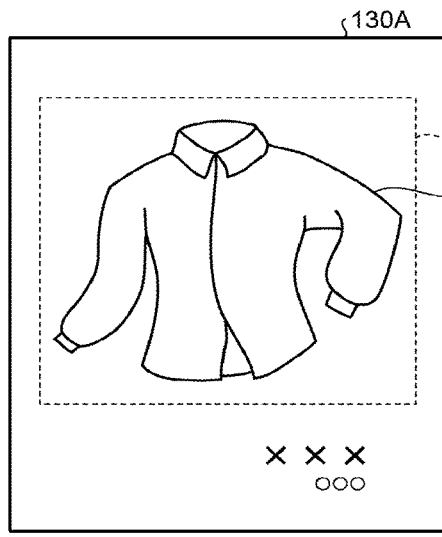
FIGS. 2A and 2B are diagrams of exemplary image data from which index data stored in a DB originates according to the embodiment.
Figure 2B:
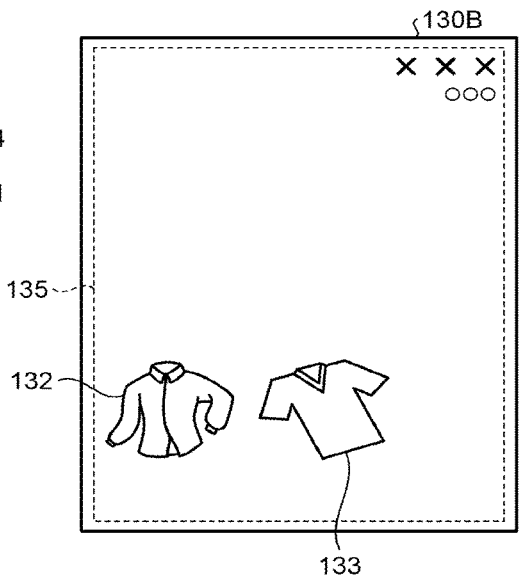

FIGS. 2A and 2B represent examples of the image data 50A and 50B from which the index data stored in the DB 12 originates. A definition is given here to an object included in image data. An object indicates an image of a main object in an image of image data, i.e., an image that is distinguished from the background image of the main object and additional information with respect to the main object in the image.

For example, the image data 50A and the image data 50B correspond to a content page that is part of a catalog and the front page of the catalog, respectively. FIG. 2A represents an example of the image data 50A with an image 130A of a content page and FIG. 2B indicates an example of the image data 50B with a front page image 130B.

FIG. 2A represents an example where an object 131 is disposed at the center of the image 130A. In the image 130A, a target region 134 including the object 131 is set for the object 131. FIG. 2A represents an example where the ratio of the size of the object 131 with respect to the size of the target region 134 is small. For catalogs, content pages are aimed at introducing items and thus the object 131 representing the item is displayed large with respect to the content page.

FIG. 2B represents an example where multiple objects 132 and 133 are disposed on the image 130B. The object 132 is a reduced image of the object 131 represented in FIG. 2A and the object 133 is a different image. Many more objects may be disposed in the image 130B. In this example, the objects 132 and 133 included in the content page are reduced in size and displayed as thumbnails such the overview of the contents of the catalog are represented. In the image 130B, the target region 135 includes the objects 132 and 133 and is set such that it stretches over the display page (the image 130B).

The target regions 134 and 135 are used as indices for recognizing the object 131 and the objects 132 and 133. Each of the target regions covers the whole object(s) and can be set in an arbitrary size smaller than the whole image including the object(s).

Linkage information will be described here. The linkage information is information indicating a function of linkage with an object(s) included in an image. More specifically, linkage information is information that includes an access method for accessing attribute information of the object(s). Thus, it can be considered that the linkage information is stored, in the DB 12, in association with an object(s) included in an image.

In an example, for the object 131 included in the image 130A of the content page, the linkage information is the URL (Uniform Resource Locator) of the commercial site 30A that deals with the item represented by the object 131 or the URL of a purchase page for making a setting for purchasing the item. Alternatively, the phone number or mail address of the shop that deals with the item may be used as the linkage information. Furthermore, information for downloading a data file including the information on the item may be used as the linkage information. In the DB 12, one object may be associated with multiple sets of linkage information.

In another example, for each of the objects 132 and 133 included in the image 130B on the front page, for example, the URL of a site, on the network 10, introducing the catalog including that front page can be used as the linkage information.

Figure 3:
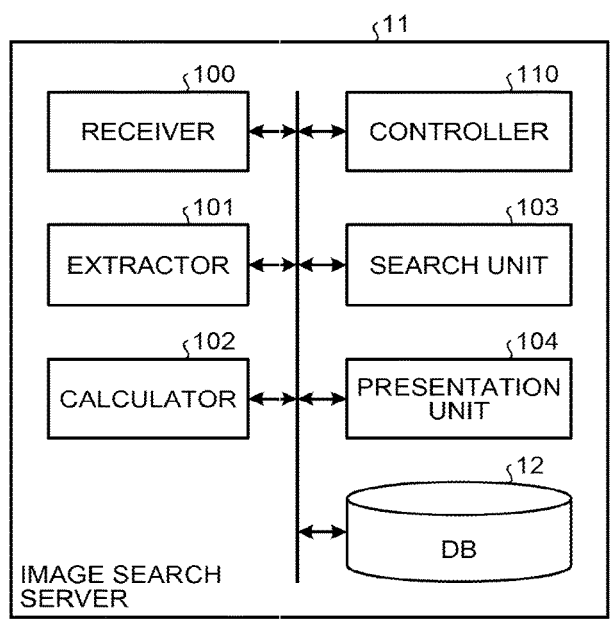
FIG. 3 is a functional block diagram of exemplary functions of an image search server according to the embodiment.

FIG. 3 is a functional block diagram of exemplary functions of the image search server 11. The image search server 11 includes a receiver 100, an extractor 101, a calculator 102, a search unit 103, a presentation unit 104, and a controller 110. FIG. 3 represents that the image search server 11 includes the DB 12. The controller 110 controls whole operations of the image search server 11. The image search server 11 is configured to include at least one computer.

The receiver 100 receives data that is transmitted via the network 10. For example, the receiver 100 receives the captured image (a captured image 40A) that is transmitted from the terminal device 20.

The extractor 101 analyzes the captured image 40A received by the receiver 100, detects a feature from the captured image 40A, and extracts an object included in the captured image 40A. For example, the extractor 101 performs binarization processing on the captured image 40A, performs edge detection and normalization processing on the binarized captured image 40A, and detects a feature of the captured image 40A. The object is represented by the detected feature.

The calculator 102 compares the feature of the captured image 40A extracted by the extractor 101 with features indicating objects each searched by each index stored in the DB 12. On the basis of the result of the comparison, similarity between the object included in the captured image 40A and each object searched with each index stored in the DB 12. The similarity can be calculated by, for example, making comparison on the relationship between features extracted from images with respect to each image. In an example, numeric conversion is performed on the relationship between features to calculate the amount of feature, and an absolute value of difference of the amount of feature between the images is calculated. If the calculated absolute value of difference is much smaller, it is determined that the images have high similarity.

On the basis of the similarity calculated by the calculator 102, the search unit 103 searches an image with high similarity with respect to each object included in the captured image 40A from among the objects searched with the respective indices stored in the DB 12. The search unit 103 outputs, as the result of the search, one index including the object having the highest similarity with respect to each object included in the captured image 40A from among the objects searched with the respective indices stored in the DB 12.

Alternatively, the search unit 103 may output, as the search result, a given number of indices according to the descending order of the similarity of objects with respect to the object included in the captured image 40A from among the objects searched with the respective indices stored in the DB 12. Alternatively, the search unit 103 may output, as the search result, at least one index for searching for objects having similarity equal to or larger than a threshold. Furthermore, as the search result, indices with similarity within a predetermined range (5%) with respect to the maximum value of similarity calculated with respect to the captured image 40A may be output.

The presentation unit 104 retrieves linkage information associated with the indices, which are the search output from the search unit 103, from the DB 12 and represents (transmits) the linkage information to the terminal device 20. Thus, the presentation unit 104 has a transmitter function of transmitting linkage information to the terminal device 20. Representation of the linkage information may be performed by directly transmitting the linkage information to the terminal device 20 or by generating a Web page including the linkage information and representing a method of accessing the Web page (URL, etc.) to the terminal device 20. By accessing the Web page, the terminal device 20 can acquire the linkage information.

Alternatively, application software (hereinafter, "application") for performing a series of operations from capturing of the captured image 40A to displaying of the presented linkage information may be previously installed in the terminal device 20 and the presented linkage information may be acquired with the application.

The image search server 11 may be configured with a general-use computer device (information processing device) that includes a CPU (Central Processing Unit), a RAM (Random Access Memory), a ROM (Read Only Memory), and a storage device such as a hard disk drive. The image search server 11 is not limited to the configuration with one computer device. For example, the image search server 11 may be, for example, configured to operate discretely on multiple computer devices.

The receiver 100, the extractor 101, the calculator 102, the search unit 103, the presentation unit 104, and the controller 110 are implemented with a search program executed by the CPU. Alternatively, part of or all of the receiver 100, the extractor 101, the calculator 102, the search unit 103, the presentation unit 104, and the controller 110 may be implemented with individual sets of hardware that cooperatively operate. The search program for performing the search process according to the embodiment is recorded in a computer-readable recording medium, such as a CD or a DVD, in a file and in an installable or executable format and provided.

Furthermore, the search program for performing the search process according to the embodiment may be provided in a way that the search program is stored in a computer that is connected to a communication network, such as the Internet, such that the search program can be downloaded. The search program for performing the search process according to the embodiment may be provided or distributed via a communication network, such as the Internet.

For example, the search program for performing the search process according to the embodiment has a module configuration including each unit (the receiver 100, the extractor 101, the calculator 102, the search unit 103, the presentation unit 104, and the controller 110). In real hardware, the CPU reads and executes the search program from the storage device so that each unit is downloaded to the main storage device (i.e. RAM) and each unit is implemented in the main memory device.

With such a configuration, a user uses the terminal device 20 to capture images of pages of the catalog and acquires the captured images 40A and 40B. In this example, the captured images 40A and 40B are acquired by capturing images of a content page and the front page of the catalog. For example, the user transmits the captured image 40A to the image search server 11 via the network 10.

The receiver 100 of the image search server 11 receives the captured image 40A and the extractor 101 detects a feature of the received captured image 40A and extracts an object. Furthermore, on the basis of the feature detected by the extractor 101, the calculator 102 calculates similarity between the object included in the captured image 40A and each object searches with each index stored in the DB 12. On the basis of the result of the calculation, the search unit 103 searches for an index. The presentation unit 104 retrieves linkage information from the DB 12 on the basis of the search output from the search unit and represents the linkage information to the terminal device 20 that transmitted the captured image 40A.

The user can, for example, accesses the commercial site 30A on the basis of the linkage information represented by the image search server 11 to the terminal device 20 and purchase the item represented by the object included in the captured image 40A.

For example, the terminal device 20 captures, as the captured image 40A, an image including an object very similar to the object 131 included in the image 130A represented in FIG. 2A and the DB 12 stores the image 130A including the object 131 and the image 130B including the object 132 that is reduced from the object 131.

In this case, there is a possibility that not the image 130A but the image 130B is searched as a result of the search based on the similarity calculated from the result of detection of the feature of the captured image 40A. If the image 130B is searched, the user cannot acquire intended linkage information. In order to prevent such a case, the search unit 103 searches images stored in the DB 12 on the basis of the size ratio between the target region (image capturing area) and the object in the embodiment.

With reference to FIG. 2, more detailed descriptions will be provided below. The object 131 is disposed in the image 130A represented in FIG. 2A such that the object 131 occupies a large space in the image 130A and, for the object 131, a target region 134 is set in a size slightly larger than the size of the object 131. In contrast, the object 132 reduced from the object 131 is disposed in the image 130B represented in FIG. 2B and a target region 135 is set over the image 130B, i.e., in a size sufficiently large with respect to the object 132.

In the image 130A, the value of a first ratio of the size of the object 131 with respect to the size of the target region 134, which is calculated on the basis the areas of the object 131 and the target region 134, is ½. In contrast, in the image 130B, the value of a second ratio of the size of the object 132 with respect to the size of the target region 135, which is calculated on the basis the areas of the object 132 and the target region 135, is 1/16 that is significantly different from the case of the image 130A. The method of calculating the size ratio is not limited to the area-based method. Such information indicating the size ratio can be previously calculated, included in an index, and stored in the DB 12.

For the captured image 40A received from the terminal device 20, the ratio between the size of an object extracted by the extractor 101 and the size of the captured image 40A can be calculated. For example, the captured image 40A is the image represented by the image 130A in FIG. 2A and a third ratio of the size of the object (the object 131) with respect to the size of the captured image 40A is, for example, ¼.

In this case, the third ratio is more close to the first ratio than the second ratio is. Thus, the search unit 103 outputs, as the result of search with respect to the captured image 40A, an index corresponding to the image 130A. The presentation unit 104 then represents the linkage information associated with the index corresponding to the image 130A to the terminal device 20. By selecting an index on the basis of the ratio of the size of an object with respect to the size of an image as described above, a intended index can be selected more accurately.

FIGS. 4A and 4B represent exemplary configurations of the DB 12 for implementing a process of searching for an image on the basis of the size ratio of an object. FIG. 4A represents an exemplary index table 120 for identifying each set of index data stored in the DB 12. For each set of index data, as represented in FIG. 4A, IDs and binary data of index data are stored in association with each other in the DB 12.

The format of ID is not particularly limited as long as each ID can identify each set of index data stored in the DB 12. If each set of index data stored in the DB 12 is for searching for an object of each page of the catalog, a value including the page number of the page with the object can be used as an ID.

FIG. 4B represents a target region table 121 where the ID of an image and a target region are associated with each other. In this example, the target region is described with XML (extensible markup language) that is one of markup languages that defines and describes the meaning and structure of data with tag. The description of linkage information is embedded in the description of the target region. The XML code where the target region is described may be directly stored in the field of the target region table 121, or the XML code may be separately described in a file and the name and pass of the file may be described in the field.

FIG. 5 represents exemplary XML code 140 represented in FIG. 4B. The XML code 140 represented in FIG. 5 is an exemplary description of the target region of a content page of the catalog. The page is defined by the part sandwiched between the outermost tags "" and "". In each of parts $141_1$ and $141_2$, the part sandwiched by the tags "<hotspot>" and "</hotspot>" defines one target region. In this manner, multiple target regions may be defined for one page.

In the part $141_1$, the part sandwiched by the tags "<area>" and "</area>" of the first row 142 defines the area of the target region in the page with, for example, the coordinates (x1,y1) on the left upper corner and the coordinates (x2,y2) on the right lower corner.

In each of the parts $143_1$ and $143_2$, the part sandwiched by the tags "<link>" and "</link>" defines one set of linkage information. In this manner, multiple sets of linkage information may be defined for one target region. In the part $143_1$, the part sandwiched by the tags "<title>" and "</title>" defines the title of the linkage information. The part sandwiched by the tags "<type>" and "</type>" defines the type of the linkage information. In this example, for the linkage information, the part sandwiched by the tags "<URI>" and "</URI>" defines the address information on the network 10.

As described above, because the XML code 140 defines the target region in the page and the linkage information for the target region, the function implemented with the linkage information associated with the object included in the target region in the page can be implemented.

Figure 6:
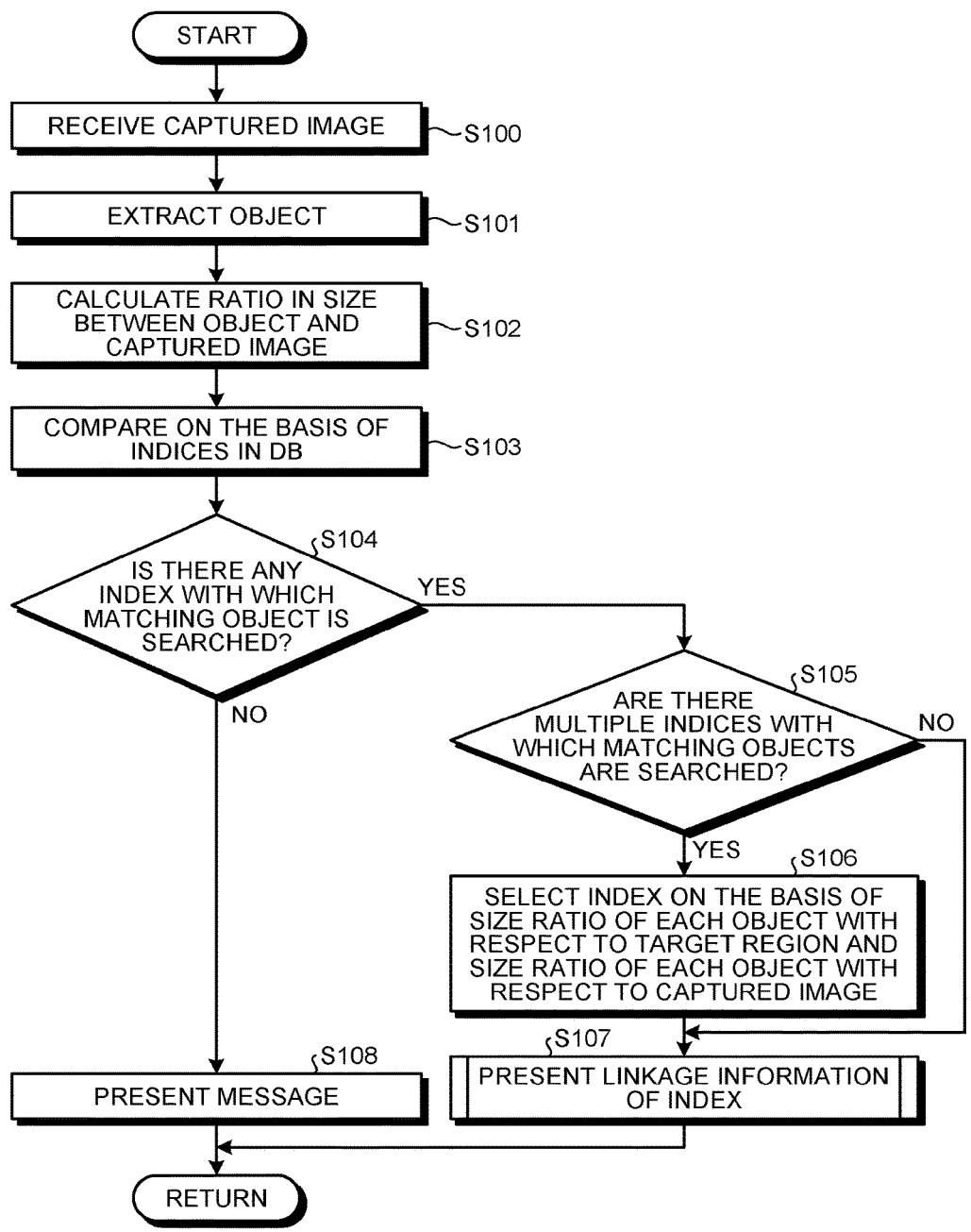
FIG. 6 is a flowchart of exemplary operations of an image search server according to the embodiment.

FIG. 6 is a flowchart of exemplary operations performed by the image search server 11 according to the embodiment. For example, the captured image 40A acquired by capturing an image with the terminal device 20 is transmitted to the image search server 11 via the network 10. At step S100, the receiver 100 of the image search server 11 receives the captured image 40A. At step S101, the extractor 101 analyzes the received captured image 40A, detects a feature, and extracts an object.

At step S102, the search unit 103 calculates the ratio of the size of the object with respect to the size of the captured image 40A. The ratio of the size of an object with respect to the size of a target region is previously calculated for each image stored in the DB 12. The information indicating the size ratio of each image stored in the DB 12 can be embedded in the XML code 140.

At step S103, the calculator 102 compares the object extracted from the captured image 40A with each object searched with each index stored in the DB 12. More specifically, the calculator 102 calculates similarity between the object included in the captured image 40A and each object searched with each index stored in the DB 12.

At step S104, the search unit 103 determines whether or not there is any index with which an object that matches the object included in the captured image 40A from among the indices stored in the DB 12 is searched. In this example, it is determined that an object with similarity equal to or larger than a threshold from among the objects searched with the indices stored in the DB 12 corresponds to an index with which an object that matches the object included in the captured image 40A is searched.

When it is determined that there is an index corresponding to an object that matches the object included in the captured image 40A at step S104, the search unit 103 shifts the processing to step S105. At step S105, the search unit 103 determines whether there are multiple indices corresponding to objects that match the object included in the captured image 40A from among the indices stored in the DB 12. When it is determined that there is only one index corresponding to an object that matches the object included in the captured image 40A, the search unit 103 uses the index as the search output and shifts the processing to step S107. In contrast, when it is determined that there are multiple indices corresponding to objects that match the object included in the captured image 40A, the search unit 103 shifts the processing to step S106.

At step S106, the search unit 103 calculates the ratio of the size of each of the multiple objects searched with the multiple indices with respect to the size of the target region. The ratios of the multiple objects may be previously calculated and stored in the DB 12. For the captured image 40A, the search unit 103 also calculates the ratio of the size of the object with respect to the size of the captured image 40A. The search unit 103 determines a ratio that is most close to the ratio calculated for the captured image 40A from among the ratios calculated for the multiple objects, respectively, selects an index for searching the object corresponding to the determined ratio, uses the selected index as the search output, and shifts the processing to step S107.

At step S107, the presentation unit 104 retrieves linkage information associated with the index, which is the search output from the search unit 103, from the DB 12. The presentation unit 104 presents the retrieved linkage information to the terminal device 20 that transmitted the captured image 40A. Then, the series of processes of the flowchart in FIG. 6 ends.

When it is determined that there is no index corresponding to an object that matches the object included in the captured image 40A at step S104, the process is shifted to step S108 where the presentation unit 104 presents, to the terminal device 20, a message indicating that there is no index corresponding to an object that matches the object included in the captured image 40A in the DB 12. Then, the series of processes of the flowchart in FIG. 6 ends.

Figure 7:
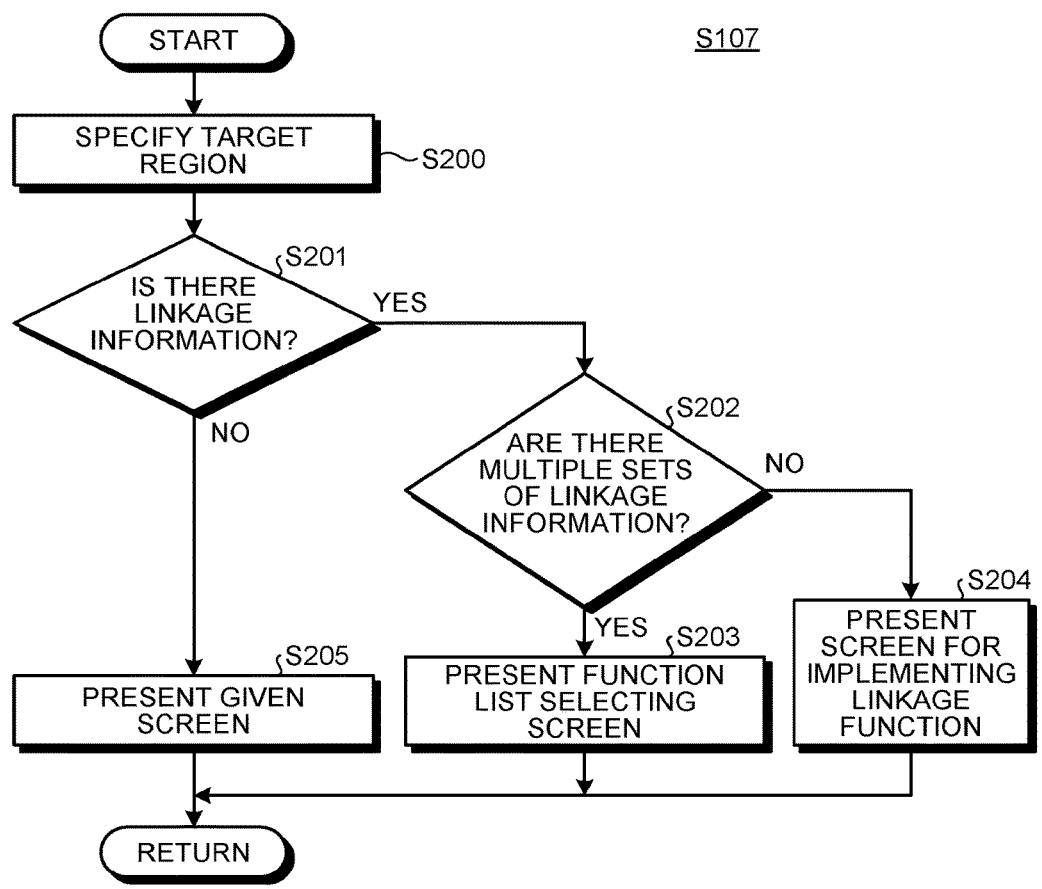
FIG. 7 is a flowchart of exemplary processes for presenting index linkage information according to the embodiment.

FIG. 7 is a flowchart of exemplary processes for presenting linkage information associated with the index at step S107 in FIG. 6. At step S200, first, the presentation unit 104 specifies the target region corresponding to the captured image 40A for the object that is searched with the index, which is the search output from the search unit 103. At step S201, the presentation unit 104 refers to the DB 12 and determines whether or not there is linkage information associated with the specified target region. When it is determined that there is linkage information associated with the specified target region, the presentation unit 104 shifts the processing to step S202 and determines whether or not there are multiple sets of linkage information associated with the target region.

When the presentation unit 104 determines that there are multiple sets of linkage information associated with the target region at step S202, the presentation unit 104 shifts the processing to step S203. At step S203, the presentation unit 104 creates a function list representing each function according to the multiple sets of linkage information and presents a selecting screen for selecting one function from the function list to the terminal device 20. For example, if the URL and phone number are associated to each other as linkage information for the specified target region, the presentation unit 104 generates a selecting screen for selecting a function of accessing the address represented by URL and a function of calling the phone number and presents the selecting screen to the terminal device 20. Then, the series of processes of the flowchart of FIG. 7 ends.

When the presentation unit 104 determines that there is only one set of linkage information associated with the target region at step S202, the presentation unit 104 shifts the processing to step S204. At step S204, the presentation unit 104 generates a screen for implementing the function according to that one set of linkage information and represents the screen to the terminal device 20. Then, the series of processes of the flowchart of FIG. 7 ends.

At step S201, when it is determined that no linkage information is associated with the target region specified at step S200, the process is shifted to step S205. At step S205, the presentation unit 104 presents a predetermined given screen to the terminal device 20. Then, the series of processes of the flowchart of FIG. 7 ends.

It has been described that, at step S106, the image search server 11 selects one of multiple indices, embodiments are not limited to this example. Alternatively, a user may be prompted to perform the process of selecting one of multiple indices.

Figure 8:
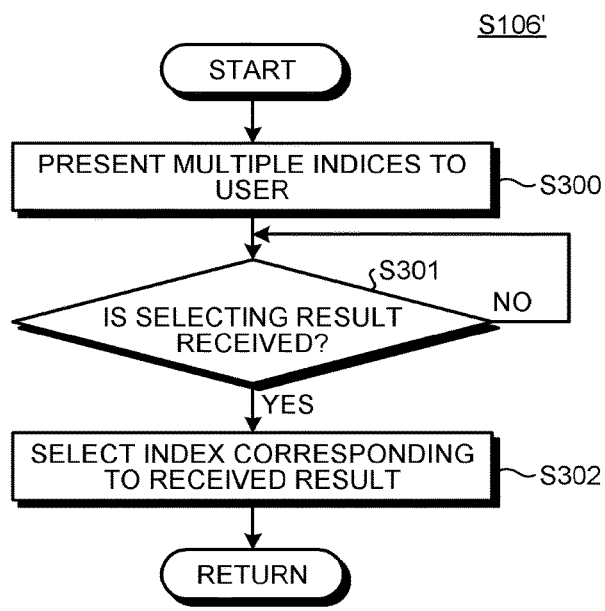
FIG. 8 is a flowchart of exemplary processes for prompting a user to perform a process of selecting one of multiple indices according to the embodiment.

FIG. 8 is a flowchart of exemplary processes for prompting a user to perform a process of selecting one of multiple indices that are the search output of the search unit 103. When the search unit 103 determines, at step S105 of FIG. 6, that there are multiple indices corresponding to objects that match the object included in the captured image 40A, the search unit 103 shifts the processing to step S106' in FIG. 8.

When the processing is shifted to step S106', the presentation unit 104 generates, at step S300, a screen for presenting information representing multiple indices that are determined to correspond to objects that match the object included in the captured image 40A and presents the screen to the terminal device 20. For example, the presentation unit 104 can generates a screen for displaying images of objects searched with the multiple indices, respectively, and presents the screen to the terminal device 20.

The presentation unit 104 waits until the result of selecting one of multiple indices (object images) is received from the terminal device 20 (step S301). Upon receiving the fact that one of the multiple indices presented at step S300 is selected from the terminal device 20, the presentation unit 104 selects, at step S302, one of the multiple object images that are searched with the indices and that match the object included in the captured image 40A. The presentation unit 104 then retrieves linkage information associated with the index with which the selected object is searched and represents the linkage information to the terminal device 20.

As described above, presenting multiple images to the user also allows the user to select an intended image more accurately.

Figure 9:
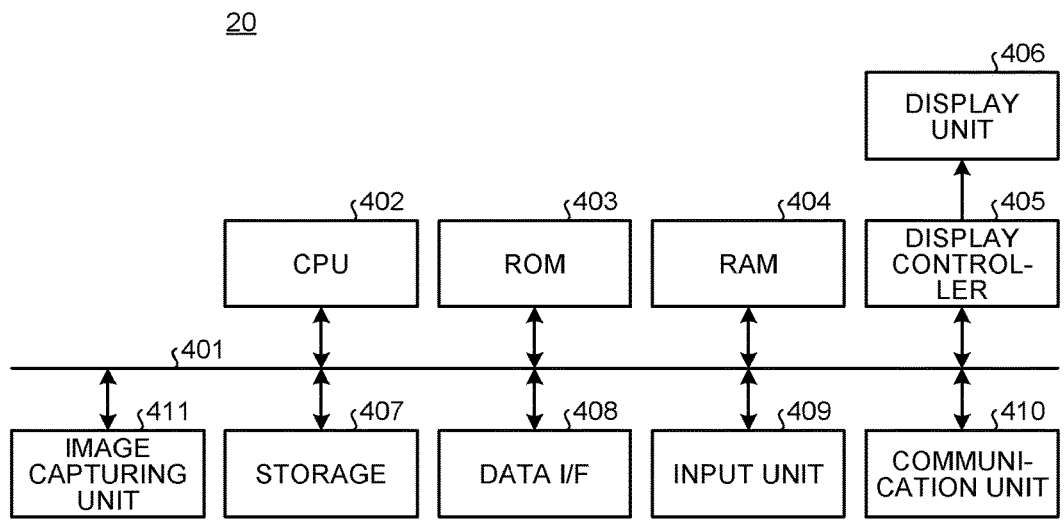
FIG. 9 is a block diagram of an exemplary configuration of a terminal device according to the embodiment.

FIG. 9 represents an exemplary configuration of the terminal device 20. In the terminal device 20 illustrated in FIG. 9, a CPU 402, a ROM 403, a RAM 404, and a display controller 405 are connected to a bus 401. Furthermore, a storage 407, a data I/F 408, an input unit 409, a communication unit 410, and an image capturing unit 411 are connected to the bus 401. The storage 407 is a storage medium that can store data in a non-volatile manner and is, for example, a non-volatile semiconductor memory, such as a flash memory. Alternatively, a hard disk drive may be used for the storage 407.

According to the programs that are stored in the ROM 403 and the storage 407, the CPU 402 controls the whole terminal device 20 by using the RAM as a work memory. The display controller 405 converts a display control signal that is generated by the CPU 402 to a signal that can be displayed by a display unit 406 and outputs the signal.

The storage 407 stores the program executed by the CPU 402 and various types of data. The data I/F 408 inputs external data. For the data I/F 408, for example, an interface using a USB (Universal Serial Bus) or IEEE1394 (Institute of Electronic and Electronics Engineers 1394) may be used.

The input unit 409 includes an input device that receives a user's input and outputs a given control signal. For example, by operating the input device according to the display on the display unit 406, the user can give an instruction to the terminal device 20. It is preferable that the input device that receives a user's input be configured integrally with the display unit 406 and be configured as a touch panel that outputs a control signal corresponding to the pressed position and transmits therethrough the image on the display unit 406.

The communication unit 410 communicates with the network 10 with a given protocol. With an optical system, an imaging device, and a control drive circuit for the optical system and the imaging device, the image capturing unit 411 performs a given process on a signal that is output from the imaging device and outputs the processed signal as image data. The image capturing unit 411 implements the image capturing and zoom functions. The captured image obtained by the image capturing unit 411 is transmitted to the communication unit 410 via, for example, the bus 401 and is transmitted to the image search server 11 via the network 10 according to the instruction from the CPU 402.

With a browser application for browsing websites on the network 10, the terminal device 20 configured as described above can display each set of information presented by the presentation unit 104 of the image search server 11. With the browser application, the terminal device 20 can also transmit requests or data to the image search server 11.

In this case, the presentation unit 104 of the image search server 11 generates display control information for displaying each set of information to the terminal device 20 with, for example, HTML (HyperText Markup Language) and various script languages and disposes the generated file in a given address on the network 10. The presentation unit 104 notifies the terminal device 20 of the address, which allows the terminal device 20 to access the display control information and display each set of information presented by the presentation unit 104.

Figure 10:
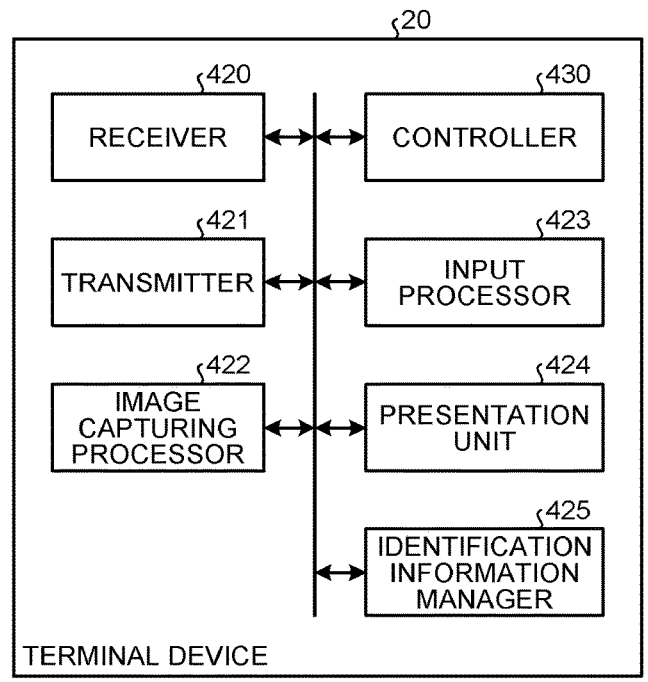
FIG. 10 is a functional block diagram of exemplary functions of the terminal device according to the embodiment.

Alternatively, a terminal program (referred to as "image search terminal application") for performing a series of processes from transmitting of a captured image to displaying of presented information can be installed in the terminal device 20. FIG. 10 is a functional block diagram representing exemplary functions of the terminal device 20 in this case. The terminal device 20 includes a receiver 420, a transmitter 421, an image capturing processor 422, an input processor 423, a presentation unit 424, an identification information manager 425, and a controller 430.

The image capturing processor 422 controls the image capturing operation of the image capturing unit 411 and acquires a captured image. The transmitter 421 previously has the address information of the image search server 11 on the network 10 and performs processes for transmission to the image search server 11 via the network 10. The transmitter 421 transmits the captured image acquired by the image capturing processor 422 to the image search server 11. The receiver 420 receives information that is transmitted from the server. For example, the receiver 420 receives information presented by the presentation unit 104 of the image search server 11.

The input processor 423 processes user's inputs to the input unit 409 that is hardware. The presentation unit 424 passes a prepared UI image to the display controller 405 and causes the display unit 406 to display a screen of the UI image. The presentation unit 424 also generates a display screen based on information received by the receiver 420, e.g. information presented by the presentation unit 104 of the image search server 11, and causes the display unit 406 to display the display screen via the display controller 405. The presentation unit 24 may present information by not only displaying it but by sound.

The identification information manager 425 manages identification information (application ID) that is uniquely acquired for the image search terminal application that is installed in the terminal device 20. A detailed description of the application ID will be given below.

The controller 430 controls whole operations of the terminal device 20. The controller 430 can implement a linkage function based on the linkage information that corresponds to the captured image and that is presented by the presentation unit 104 of the image search server 11. For example, when a URL is specified in linkage information, the controller 430 calls a browser application installed in the terminal device 20 so as to allow access to the address represented by the URL.

The receiver 420, the transmitter 421, the image capturing processor 422, the input processor 423, the presentation unit 424, the identification information manager 425, and the controller 430 are implemented with the terminal program that is operated by the CPU 402. The terminal program is stored in a computer connected to the network 10 and downloaded via the network 10 so as to be provided. Alternatively, the terminal program may be provided or distributed via the network 10. The terminal program may be provided by previously storing the program in the ROM 403.

Alternatively, the terminal program may be provided by recording it in a computer-readable recording medium, such as a CD or a DVD, in a file in an installable or executable format. In this case, for example, the terminal program is provided to the terminal device 20 via an external drive device connected to the data I/F 408.

The terminal program has, for example, a module configuration including each of the above-described units (the receiver 420, the transmitter 421, the image capturing processor 422, the input processor 423, the presentation unit 424, the identification information manager 425, and the controller 430). For actual hardware, for example, the CPU 402 reads the terminal program from the storage 407 and executes the terminal program so that each of the units is loaded in the main storage unit (e.g. the RAM 404) and generated in the main storage unit.

First Embodiment

Figure 11:
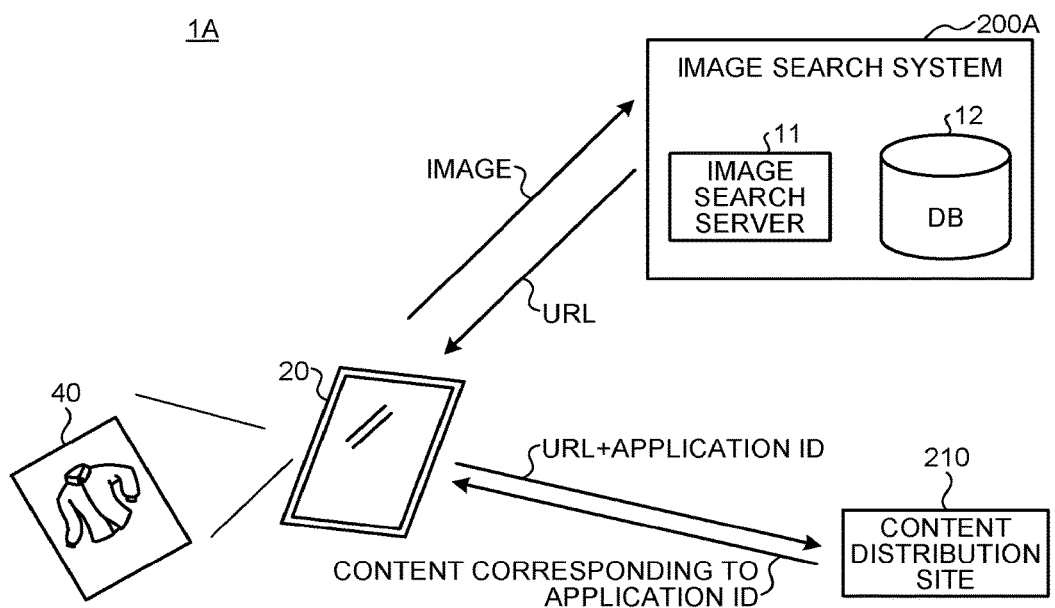
FIG. 11 is a schematic diagram of an exemplary configuration of an information processing system according to a first embodiment of the present invention.

A first embodiment will be described here. FIG. 11 schematically illustrates an exemplary configuration of the information processing system according to a first embodiment. Detailed descriptions of FIG. 11 will be omitted by denoting parts represented in FIG. 11 in common with FIG. 1 with the same reference numerals as those in FIG. 1.

An information processing system 1A represented in FIG. 11 includes an image search system 200A and the terminal device 20 that are connected with each other via a network. The image search system 200A corresponds to the image search system 200 and includes the image search server 11 and the DB 12. As described above, the image search server 11 is configured to include at least one computer.

Index data on an object corresponding to the captured image 40 and linkage information corresponding to the object are registered in association with each other in the DB 12 by, for example, the operator of a content distribution site 210 or according to a request from the operator. The linkage information is, for example, the URL of the content distribution site 210 or the URL of each content distributed in response to access to the content distribution site 210.

The terminal device 20 captures, for example, an image of a paper medium and transmits the captured image 40 to the image search system 200A. The captured image 40 is received by the image search system 200A and then supplied to the image search server 11. The image search server 11 extracts an object from the captured image 40 as described above, searches the DB 12 on the basis of the extracted object, and acquires the URL corresponding to the object as a search result. The image search server 11 transmits the acquired URL to the terminal device 20 that transmitted the captured image 40.

With the image search terminal application, the terminal device 20 accesses, for example, the content distribution site 210 according to the URL that is transmitted from the image search system 200A in response to the transmission of the captured image 40. The terminal device 20 transmits the application ID that is managed by the identification information manager 425 to the content distribution site 210. The terminal device 20 can transmit the application ID as individual data to the content distribution site 210. Alternatively, the terminal device 20 may perform transmission of the application ID to the content distribution site 210 in a way that the application ID is added as an argument to the URL for accessing the content distribution site 210 and the URL with the application ID is passed to the content distribution site 210.

The content distribution site 210 corresponds to the commercial site 30A and the commercial site 30B represented in FIG. 1 and is configured with at least one computer. The content distribution site 210 presents, to the terminal device 20 etc., the content that includes the position on the network represented in the URL acquired as a result of search performed by the image search system 200A and that is associated with the URL.

A description will be given here for application ID. As described above, an application ID is identification information that is uniquely acquired for the image search terminal application according to the embodiment that is installed in and executed by the terminal device 20. The application ID is associated with the image search terminal application, and the user cannot change the application ID. The application ID is deleted when the image search terminal application is deleted (uninstalled) from the terminal device 20.

The application ID has different properties from those of identification information that the user sets and the user can change, such as a mail address or account information. Furthermore, the application ID has different properties from those of identification information that is associated with the terminal device 20 and that cannot be changed by the user, such as a device ID. Furthermore, because the application ID is unique to the image search terminal application that is installed in the terminal device 20, the application ID can be practically used as the identification information of each terminal device 20.

Figure 12:
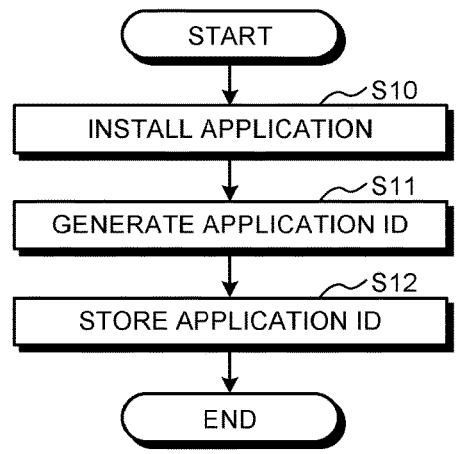
FIG. 12 is a flowchart of exemplary processes for generating an application ID according to the first embodiment.

The application ID is, for example, generated when the image search terminal application is installed in the terminal device 20 and is set for the terminal device 20. FIG. 12 is a flowchart of exemplary processes for generating an application ID according to the first embodiment. Installation of the image search terminal application in the terminal device 20 is executed by a dedicated installation program (installer).

The installer is, for example, downloaded in the terminal device 20 via the network from a server on the network and stored in the storage 407. The CPU 402 automatically outputs a command for execution of installation, for example, in response to a user's operation on the input unit 409 to issue an instruction for executing installation or upon the installer is downloaded. In response to the command, the CPU 402 loads the installer, which is stored in the storage 407, in the RAM 404 and executes the installer.

At step S10 in FIG. 12, the CPU 402 executes the installer and, according to instructions from the installer, starts installation of the image search terminal application. Once the installation starts, the CPU 402 generates and acquires an application ID according to an instruction from the installer (step S11). The installer can determine a method of generating an application ID such that the generated application ID has a unique value.

The application ID can be generated with, for example, a random number. For example, the CPU 402 can generate an application ID by combining a given length of random number with time information representing the time when the installer started the installation process or the time when the installer was downloaded. Alternatively, the CPU 402 may acquire the time information by a unit of measurement of time under second and use the time information as an application ID or may generate a sufficient length of random number and use the random number as an application ID.

At step S12, the CPU 402 stores the application ID that is generated at step S11 in the storage 407 etc. It is more preferable if the CPU 402 can keep the application ID not viewed by the user by encrypting the application ID or making the application ID invisible with a given method and then storing the application ID in the storage 407.

The following descriptions refer back to FIG. 11. The content distribution site 210 can distribute, to the terminal device 20, content corresponding to the application ID transmitted from the terminal device 20. Although it will be described in detail below, for example, the content distribution site 210 registers an application ID at the initial access. On the basis of the registered information, the content distribution site 210 makes an inquiry for the transmitted application ID. When the application has been already registered, the content distribution site 210 distributes content unique to the application ID to the terminal device 20 that transmitted the application ID.

As described above, by transmitting the application ID that is identification information unique to each image search terminal application to the URL that is acquired as a result of the image search, different content can be distributed to each terminal device 20 with respect to the same search result.

In other words, according to the first embodiment, with the information provision technology where an intended image is presented to a user with an information medium and furthermore, on the basis of the image, relevant electronic information is provided, electronic information corresponding to the presented image, the terminal that uses the image, and the user properties can be easily provided to the user.

It has been described that the content distribution site 210 presents, to the terminal device 20, content corresponding to the application ID that is transmitted from the terminal device 20. However, embodiments are not limited to this example. For example, the terminal device 20 may register given registration information in the image search terminal application, add the registration information as a classification number or a symbol to the application ID, and transmit the application ID with the registration information to the content distribution site 210. In this case, the content distribution site 210 can present content according to, in addition to the application ID, the classification number or symbol added to the application ID.

Furthermore, the content distribution site 210 may present content according to positional information indicating the position of the terminal device 20. For example, the terminal device 20 may be further provided with a GPS (Global Positioning System) unit that performs positioning by receiving a GPS signal to acquire information indicating the position where image capturing is performed with the GPS unit. The terminal device 20 adds the acquired positional information to the application ID and transmits the application ID with the positional information to the content distribution site 210. The content distribution site 210 can present content according to, in addition to the application ID, the positional information added to the application ID.

Second Embodiment

A second embodiment will be described here. It has been described, for the first embodiment, that the terminal device 20 generates an application ID, but embodiments are not limited to this. In the second embodiment, an application ID is externally generated and then set for the terminal device 20. For example, an application ID can be generated in a server that is connected to the terminal device 20 via a network. The application ID generated in the server is transmitted to the terminal device 20 via the network and stored in the storage 407 of the terminal device 20.

Figure 13:
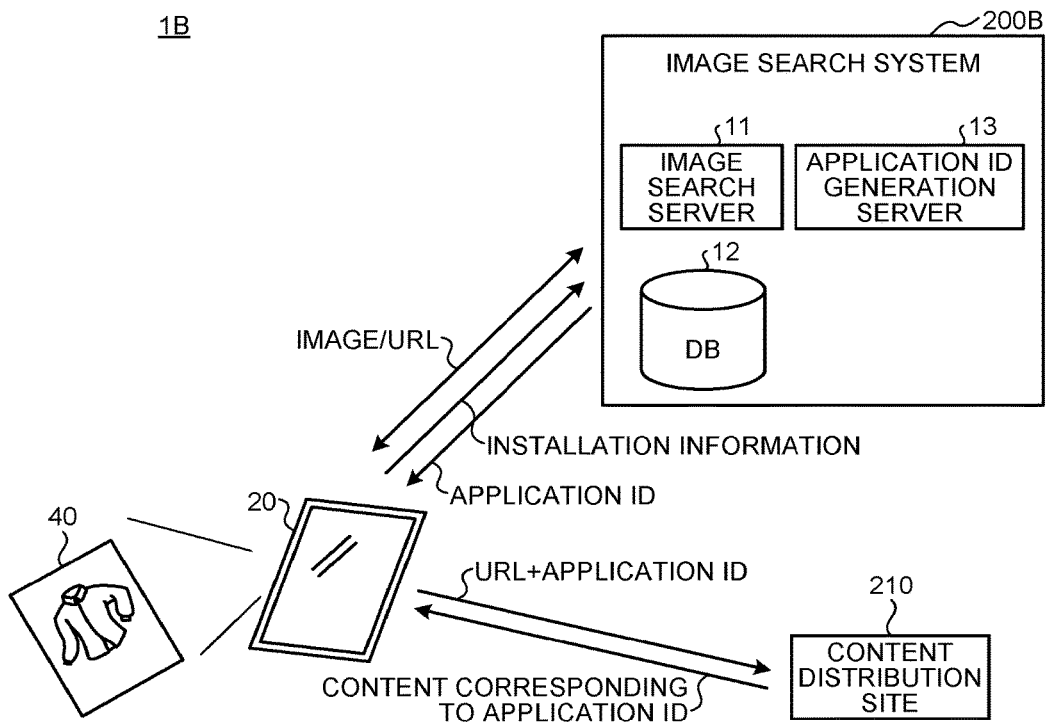
FIG. 13 is a schematic diagram of an exemplary configuration of an information processing system according to a second embodiment of the present invention.

FIG. 13 schematically illustrates an exemplary configuration of an information processing system where an application ID is generated in a server according to the second embodiment. The information processing system 1B represented in FIG. 13 implements an image search system 200B by adding an application ID generation server 13 including an identification information (application ID) generator that generates an application ID to the image search system 200A of the information processing system 1A shown in FIG. 11. The application ID generation server 13 can be configured with a general-use computer device. The application ID generation server 13 is not limited to the configuration with one computer device. Alternatively, for example, the application ID generation server 13 may be configured to operate discretely on multiple computer devices.

In this case, once the terminal device 20 starts the installed image search terminal application for the first time, installation information indicating that fact is transmitted from the terminal device 20 to the image search system 200B and supplied to the application ID generation server 13. The application ID generation server 13 generates an application ID according to the installation information and transmits the application ID to the terminal device 20.

Figure 14:
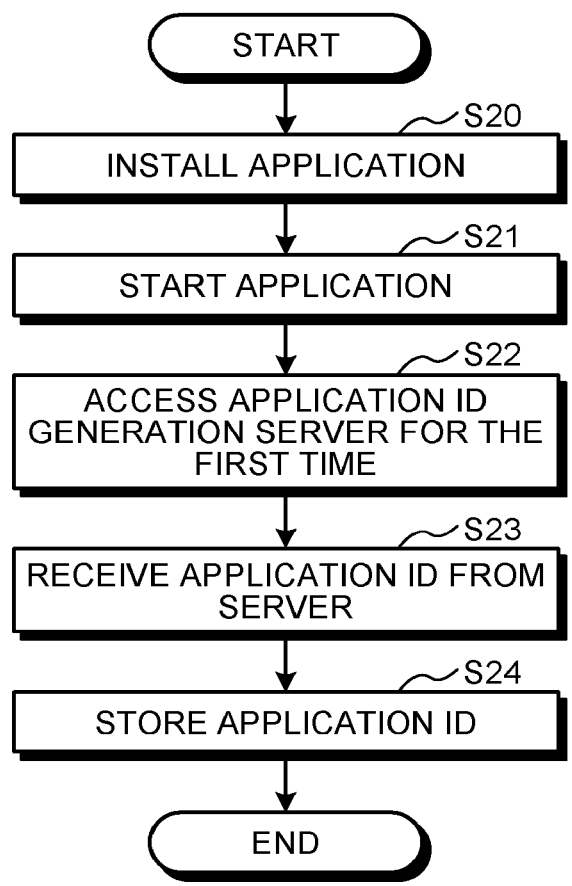
FIG. 14 is a flowchart of exemplary processes for generating an application ID according to the second embodiment.

FIG. 14 is a flowchart of exemplary processes for externally generating an application ID and setting the application ID for the terminal device 20. At step S20, the CPU 402 executes an installer to start installation of the image search terminal application according to an instruction from the installer. Once the installation completes, the CPU 402 starts the installed image search terminal application at step S21. The CPU 402 may automatically start the image search terminal application following the installation process or may start the image search terminal application in response to a user's operation on the terminal device 20.

Once the image search terminal application is started, as described above, each unit (the receiver 420, the transmitter 421, the image capturing processor 422, the input processor 423, the presentation unit 424, the identification information manager 425, and the controller 430) that causes the image search terminal application to function is generated as each module in the main storage device (e.g. the RAM 404). The CPU 420 operates according to each module so that the image search terminal application is executed.

Once the image search terminal application is started, the identification information manager 425 accesses the application ID generation server 13 according to an instruction from the image search terminal application (step S22). This access is the access made for the first time after the image search terminal application is installed in the terminal device 20. The identification information manager 425 requests the application ID generation server 13 to generate an application ID.

The application ID generation server 13 generates an application ID in response to the application ID generation request from the terminal device 20 and transmits the generated application ID to the terminal device 20.

For the method of generating an application ID, the same method as that described above may be used where a random number and time information are combined. In this case, the time at which the application ID generation server 13 receives an application ID generation request from the terminal device 20 may be used for the time information. Alternatively, the application ID generation server 13 may generate an application ID from only a random number or time information or may generate a numerical sequence as an application ID. Alternatively, the application ID generation server 13 may manage the generated application ID in association with the address information of the terminal device 20.

At step S23, the identification information manager 425 receives and acquires the application ID transmitted from the application ID generation server 13. At step S24, the identification information manager 425 stores the received application ID in, for example, the storage 407. It is preferable that the identification information manager 425 keep the application ID not viewed by the user by encrypting the application ID or making the ID invisible and store the application ID in the storage 407.

As described above, application ID generation may be performed externally with respect to the terminal device 20. In this case, the application ID generation server 13 may manage the generated application ID in association with the address information of the terminal device 20.

Third Embodiment

Figure 15:
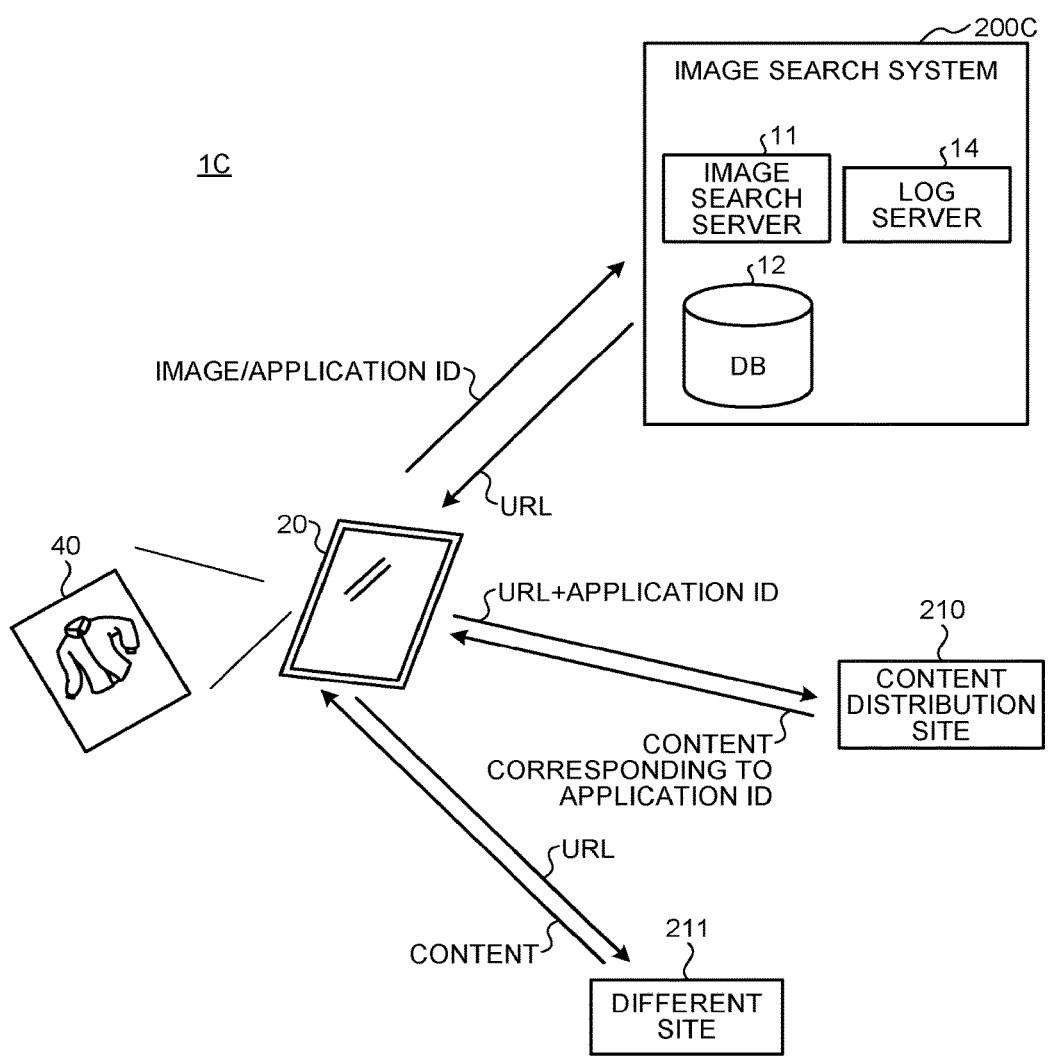
FIG. 15 is a schematic diagram of an exemplary configuration of an information processing system according to a third embodiment of the present invention.

A third embodiment will be described here. In the third embodiment, the history of access of the terminal device 20 to the image search server 11 is recorded as log information. FIG. 15 schematically illustrates an exemplary configuration of an information processing system 1C according to the third embodiment. The information processing system 1C illustrated in FIG. 15 implements an image search system 200C by adding a log server 14 that records the access history of the terminal device 20 as log information to the image search system 200A of the information processing system 1A illustrated in FIG. 11.

In the information processing system 1C illustrated in FIG. 15, the terminal device 20 transmits, to the image search system 200C, the captured image 40 in association with the application ID of the image search terminal application of the terminal device 20. In the image search system 200C, the log server 14 includes an accumulator that accumulates, as log information, the time information indicating the time when the terminal device 20 accessed the image search system 200C, the application ID, and information indicating the captured image 40 in association with each other. If the device ID that identifies the terminal device 20 can be acquired, the device ID can be recorded in association with the log information. The log server 14 can be configured with a general-use computer device. The log server 14 is not limited to a configuration with one computer device.

Alternatively, for example, the log server 14 may be configured to operate discretely on multiple computer devices.

The DB 12 stores, as linkage information corresponding to an object corresponding to the captured image 40, the URL of the content that is distributed in response to the access to the content distribution site 210 and the URL of a different site 211 that is different from the content distribution site 210 in association with each other. A video image distribution site that distributes video images is an example of the different site 211.

In this case, when the terminal device 20 selects the URL of the content that is distributed in response to access to the content distribution site 210, the content distribution site 210 can sense the access and manages the access for each application ID. However, when the terminal device 20 selects the URL of the different site 211, the content distribution site 210 cannot sense the access of the terminal device 20 to the different site 211 and thus cannot manage access for each application ID.

For this reason, in the third embodiment, the terminal device 20 transmits the captured image 40 in association with the application ID to the image search system 200C and the log server 14 accumulates, as log information, the application ID and information representing an object corresponding to the captured image 40 in association with each other. This makes it possible to sense, on the basis of the application ID, access of the terminal device 20 to the URL of the content distributed in response to access to the content distribution site 210 and access of the terminal device 20 to the different site 211.

FIG. 16 represents an exemplary configuration of a log information table in which the log server 14 accumulates log information according to the third embodiment. The log information table represented in FIG. 16 records the access date, object ID, and device information in association with an application ID. For the access date, the date when the terminal device 20 accessed the image search system 200C with the captured image 40 and the application ID is stored. The object ID is information that identifies the object that is extracted from the captured image 40. For example, for the object ID, an ID in the search table 120 described using FIG. 4A can be used.

The device information is information that identifies the terminal device 20. For the device information, the IP (Internet Protocol) address or MAC (Media Access Control) of the terminal device 20 may be used. The device information can be omitted.

FIG. 17 represents an exemplary configuration of a linkage information table where an object ID and link information (URL) are associated for each customer. In the linkage information table, a customer ID is identification information that identifies, for example, the owner of data registered in the DB 12. The owner is, for example, the operator or the operating association of the content distribution site 210. As described above, the linkage information table stores, for each ID, an object ID and a link URL in association with each other. The information stored in the linkage information table can be generated by using the information of the target region table 121 represented in FIG. 4B.

The log server 14 accumulates log information in association with the application ID in the log information table according to access of the terminal device 20. The log server 14 searches the log information table on the basis of the application ID, outputs the object ID corresponding to the intended application ID, detects the linkage information table on the basis of the object ID, and acquires the link information corresponding to each object ID. Accordingly, the operator of the content distribution site 210 can predict the number of accesses to the content distribution site 210 and the different site 211 according to the intended application ID.

First Application Example of Third Embodiment

A first application example applicable to the third embodiment will be described here. In the first application example, the content distribution site 210 performs checking with an application ID. If the application ID has been registered, the content distribution site 210 performs a registration process. If the application ID is registered, the content distribution site 210 distributes given content.

Figure 18:
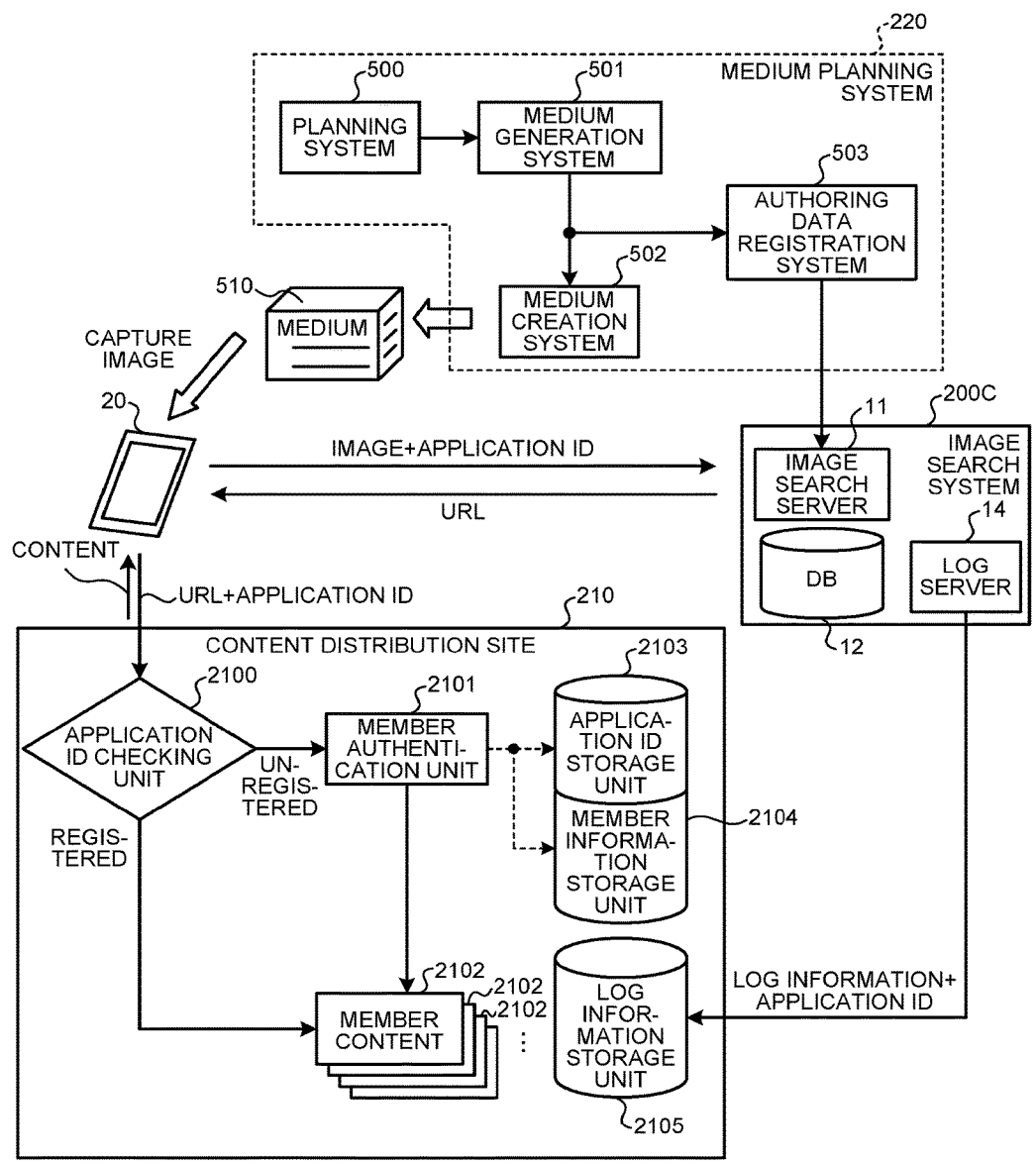
FIG. 18 is a schematic diagram of a system with which a first application example of the third embodiment can be implemented.

FIG. 18 illustrates the overview of a system that can implement the first application example. The system includes an image search system 200C, the content distribution site 210, and a medium planning system 220. In the example of FIG. 18, with the image search system 200C that includes the log server 14, log information can be provided to the content distribution site 210. When it is unnecessary to provide log information to the content distribution site 210, the image search system 200A or the image search system 200B may be used instead of the image search system 200C.

The medium planning system 220 includes a planning system 500, a medium generation system 501, a medium creation system 502, and an authoring data registration system 503.

In accordance with the content distributed by the content distribution site 210, the planning system 500 plans, for distributing the content, an image to be searched by the image search system 200C and a medium on which the search target image is formed and outputs information representing the search target image and the medium. The planning system 500 outputs the URL of the content distribution site 210 and the URL of each set of content distributed by the content distribution site 210.

On the basis of the information representing the search target image and the medium, which is information output from the planning system 500, the medium generation system 501 creates the search target image in a format suitable for the medium. The medium generation system 501 outputs the created search target image to the medium creation system 502. The medium generation system 501 outputs, to the authoring data registration system 503, the generated search target image and each URL supplied by the planning system 500.

The medium creation system 502 forms the search target image on a medium and creates a search target (image-capturing target) medium 510. For example, the medium creation system 502 is a printer that prints the search target image on a paper medium to create the search target paper medium 510. The medium 510 is not limited to a paper medium. For example, the material of the medium 510 may be other than paper or the medium 510 may be an electronic bulletin board that represents information electronically.

The authoring data registration system 503 registers the search target image and each URL, which are supplied from the medium generation system 501, in the DB 12 of the image search system 200C. Accordingly, for example, by transmitting a captured image obtained by capturing an image of the search target image on the search target medium 510 to the image search system 200C, the terminal device 20 can acquire the URL corresponding to the search target image.

For example, the terminal device 20 captures an image of the search target image on the search target medium 510 and transmits the captured image and the application ID to the image search system 200C. The image search server 11 of the image search system 200C searches the DB 12 on the basis of the captured image and acquires the URL. The URL is then transmitted to the terminal device 20. The log server 14 of the image search system 200C records and accumulates, in the log information table, the object ID that the image search server 11 acquires, by performing searching, the application ID transmitted from the terminal device 20, and the information on the date at which the terminal device 20 accessed the image search system 200C.

When accessing the URL transmitted from the image search system 200C, the terminal device 20 transmits the application ID to the URL. The URL transmitted from the image search system 200C represents the content distribution site 210 and the terminal device 20 transmits the application ID to the content distribution site 210 when accessing the content distribution site 210 according to the URL.

The content distribution site 210 prompts the user who accesses the content distribution site 210 via the terminal device 20 to do member registration and distributes member content to users who have been registered as members, i.e., to the terminal device 20, and distributes given content to users who have not been registered as members.

The content distribution site 210 includes an application ID checking unit 2100, a member authentication unit 2101, member content 2102, 2102, . . . , an applications ID storage unit 2103, a member information storage unit 2104, and a log information storage unit 2105. The member information storage unit 2104 stores information on users who have registered as members in the content distribution site 210. The application ID storage unit 2103 stores the application ID, which is transmitted from the terminal device 20 used for access for member registration by the user who have been registered as a member, in association with the information on the user that is stored in the member information storage unit 2104.

The application ID checking unit 2100 determines whether or not a user who has made an access via the terminal device 20 has been registered as a member. Specifically, the application ID checking unit 2100 determines whether or not the application ID transmitted from the terminal device 20 is stored (recorded) in the application ID storage unit 2103.

When the application ID checking unit 2100 determines that the application ID transmitted from the terminal device 20 is not stored in the application ID storage unit 2103, the application ID checking unit 2100 determines that the user has not been registered as a member. In this case, the application ID is passed to the member authentication unit 2101 and the member authentication unit 2101 transmits a notification that prompts the terminal device 20 to do member registration to the terminal device 20. When a response indicating that the user will do member registration is made via the terminal device 20 in response to the notification, the member authentication unit 2101 do given communications with the terminal device 20, acquires the user information etc., stores the user information in the member information storage unit 2104, and stores the application ID in association with the user information in the application ID storage unit 2103. Accordingly, the user is registered as a member in the content distribution site 210.

In contrast, when the application ID checking unit 2100 determines that the application ID transmitted from the terminal device 20 is stored in the application ID storage unit 2103, the application ID checking unit 2100 determines that the user has not been registered as a member. In this case, the content distribution site 210 presents the member content 2102, 2102, . . . to the terminal device 20.

It has been described that the content distribution site 210 presents the member content 2102, 2102, . . . to the user who has been registered via the member authentication unit 2101 from the access following the access for the member registration, but embodiments are not limited to this. For example, the content distribution site 210 may present the member content 2102, 2102, . . . to the user who have been registered as a member soon after the member registration.

Instead of a notification prompting member registration, a notification (screen display) may be made with which it can be selected whether to do member registration or input user information that has been already registered (log in). Member registration has been already done for users who have already done member registration and who have installed the image search terminal application in the terminal device 20 after member registration. In other words, because the user information is stored in the member information storage unit 2104, it is unnecessary to prompt member registration anew. For this reason, making a notification (screen display) with which it can be selected whether to do member registration or input user information that has been already registered prompts unregistered users to do member registration and registered users to input the registered user information. When the user inputs user information as registered user information, the member authentication unit 2101 determines whether or not the input user information is stored in the member information storage unit 2104. When the user information is stored in the member information storage unit 2104, the member authentication unit 2101 presents the user content 2102, 2102, . . . and stores the application ID in association with the input user information in the application ID storage unit 2103.

The log information storage unit 2105 stores log information provided from the log server 14 of the image search system 200C. For example, the log information storage unit 2105 accesses the log server 14 at a given time interval and acquires the log information accumulated after the previous access. Alternatively, the log server 14 may transmit the log information to the log information storage unit 2105. In this case, for example, the log information can be provided from the log server 14 to the log information storage unit 2105 each time when log information is recorded in the log server 14.

The log information storage unit 2105 can further accumulate log information on access to the content distribution site 210. By analyzing the log information accumulated in the log information storage unit 2105, the content distribution site 210 can acquire, for example, static information on access with the application ID, such as the number of accesses with each application ID.

According to the first application example, on the basis of the application ID transmitted from the terminal device 20, the content distribution site 210 can determine whether or not the access of the terminal device 20 is the access for the first time and present different types of content to the terminal device 20 according to the result of the determination. On the basis of the log information stored in the log information storage unit 2105, the access with respect to each ID can be analyzed and content can be selected and presented more flexibly according to the result of the analysis.

Second Application Example of Third Embodiment

A second application example of the third embodiment will be described here. The system configuration illustrated in FIG. 18 can be used for the second application example.

In the second application example, the member authentication unit 2101 shown in FIG. 18 performs user member registration, the content distribution site 210 registers property information (age, gender, etc.) on a user to be registered in association with the application ID transmitted from the terminal device 20. The content distribution site 210 acquires log information from the log server 14 of the image search system 200C and stores the log information in the log information storage unit 2105. When the terminal device 20 accesses the content distribution site 210 with the registered application ID, the content distribution site 210 selects content suitable for the user from among the member content 2102, 2102, . . . on the basis of the user property information, which is associated with the application ID, and the log information and presents the content to the terminal device 20.

An example will be described here where learning materials for foreign language learning, etc. are used as the member content 2102, 2102, . . . in the second application example. It is preferable that the contents of learning materials be set according to the level (age, school year, etc.) of users (learners) or their achievement. For this reason, for example, the content distribution site 210 groups the member content 2102, 2102, . . . serving as learning materials according to, for example, the difficulty of the materials.

FIG. 19 is represents exemplary grouping of the member content 2012, 1202, . . . according to the second application example. In the example of FIG. 19, three classes "Beginner", "Intermediate" and "Advanced" are set according to the difficulty of leaning materials. Furthermore, levels "A", "B", "C" etc. are set for each class according to the difficulty of leaning materials. An URL for representing a learning material is associated with each level of each class.

For example, the medium planning system 220 creates a learning material with paper media as the medium 510 and registers the information on the creation in the image search system 200C. A user captures an image of the medium 510 serving as the learning material with the terminal device 20 and transmits the captured image and the application ID to the image search system 200C. The terminal device 20 may capture an image of a specific page, such as the front page of the learning material, or an image of an arbitrary page of the leaning material.

The image search system 200C searches the DB 12 for, for example, the URL of the content distribution site 210 on the basis of the captured image transmitted from the terminal device 20 and transmits the searched URL to the terminal device 20. The image search system 200C transmits, to the log server 14, the application ID, the object ID acquired by the searching performed by the image search server 11, and the information on the date when the terminal device 20 accesses the image search system 200 in association with each other and accumulates them as log information.

The terminal device 20 accesses the content distribution site 210 according to the URL transmitted from the image search system 200C and transmits the application ID to the content distribution site 210. In response to the access of the terminal device 20, the application ID checking unit 2100 of the content distribution site 210 checks the application ID, which is transmitted from the terminal device 20, by referring to the application ID storage unit 2103 and the member information storage unit 2104 and determines whether or not the application ID is registered as a learner.

When it is determined that the application ID is not registered as a leaner, the content distribution site 210 transmits, to the terminal device 20, a notification prompting registration and inputting of user property information. When the terminal device 20 transmits agreement for registration and the property information in response to the notification, the member authentication unit 2101 of the content distribution site 210 authenticates the application ID and registers the application ID as a leaner. Specifically, the content distribution site 210 stores the application ID and the property information in association with each other in the application ID storage unit 2103 and the member information storage unit 2104. The content distribution site 210 sets classes for leaners on the basis of, for example, the property information.

When the application ID checking unit 2100 determines that the application ID transmitted from the terminal device 20 has been registered as a leaner, the content distribution site 210 searches the log information storage unit 2105 for the log information corresponding to the application ID. The content distribution site 210 determines the level of the learner in the class set for the learner according to the result of searching. For example, when there are a given number of or more accesses with the application ID to a level (URL), the content distribution site 210 shifts the level of the application ID to a higher level.

As described above, in the second application example, on the basis of the application ID and the log information, the content distribution site 210 can present content appropriate to each user to the terminal device 20 that transmitted the application ID. Because the content distribution site 210 authenticates application IDs, it is unnecessary to perform a log-in operation each time when the terminal device 20 accesses the content distribution site 210.

Third Application Example of Third Embodiment

A third application example of the third embodiment will be described here. The system configuration illustrated in FIG. 18 can be used for the third application example.

In the third application example, a restriction is imposed on access with the same application ID according to the number of times of accesses. For example, accesses up to a given number of times may be permitted within a given period of time or within each given period of time. Alternatively, accesses up to a given number of times may be permitted for the same application ID. Entry for a campaign with the terminal device 20 is an example for which such a restriction on access with the same application ID is used.

For example, a campaign that takes place for a given time period is assumed where entry with the same application ID is allowed once a day and, once the date changes, the entry restriction is canceled to allow entry again. In this campaign, the result will be announced soon after the campaign period ends.

Figure 20:
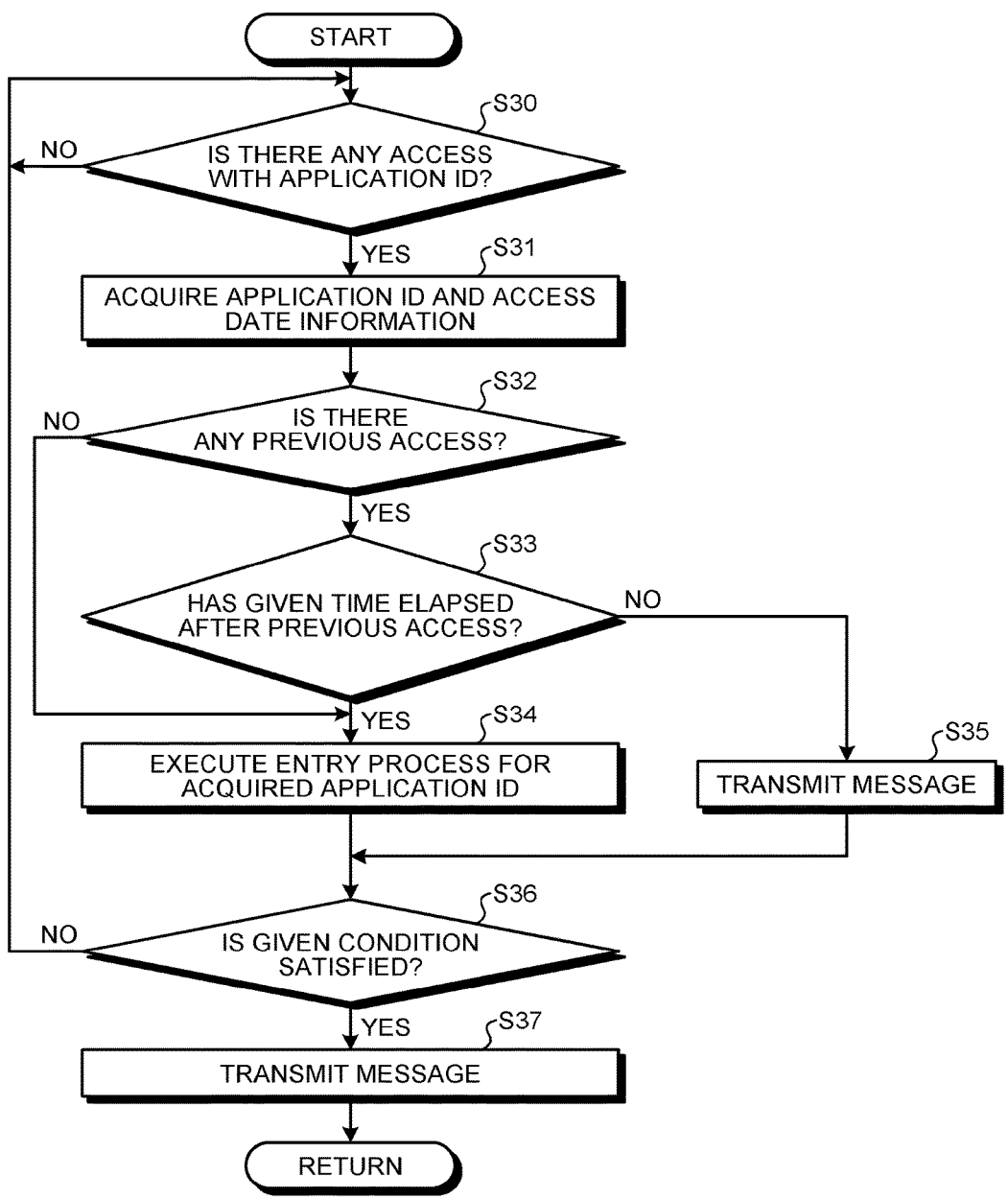
FIG. 20 is a flowchart of exemplary processes performed by a content distribution site according to a third application example of the third embodiment.

FIG. 20 is a flowchart of exemplary processes performed by the content distribution site 210 according to the third application example. Prior to the processes of the flowchart, the medium planning system 220 creates, as the medium 510, an application form (a paper medium) for a campaign and registers the information indicating the fact in the image search system 200C. The content distribution site 210 waits access of the terminal device 20 with the application ID (step S30).

The terminal device 20 captures an image of the medium 510 and transmits the captured image and the application ID to the image search system 200C. On the basis of the captured image that is transmitted from the terminal device 20, the image search system 200C searches the DB 12 for the URL of the content distribution site 210 and transmits the searched URL to the terminal device 20. In the image search system 200C, the application ID, the object ID that is acquired by the searching performed by the image search server 11, and the information on the date when the terminal device 20 accessed the image search system 200C are transmitted in association with each other to the log server 14 and are accumulated as log information.

The terminal device 20 accesses the content distribution site 210 according to the URL transmitted from the image search system 200C and transmits the application ID to the content distribution site 210. Upon detecting the access of the terminal device 20 with the application ID, the content distribution site 210 shifts the processing to step S31 and acquires the application ID and the date information indicating the time when access was made. The acquired application ID and date information are stored in association with each other in, for example, the log information storage unit 2105.

At step S32, on the basis of the log information stored in the log information storage unit 2105, the content distribution site 210 determines whether or not there has been any access with the application ID for which access is detected at step S30. When the content distribution site 210 determines that there has been no access with the application ID, the content distribution site 210 shifts the processing to step S34 and executes a given entry process for the application ID.

When the content distribution site 210 determines that there has been access with the application ID at step S32, the content distribution site 210 shifts the processing to step S33. At step S33, the content distribution site 210 determines whether or not a given time (a day in this example) after which the application restriction on entry with the same application ID is canceled has elapsed after the previous access with the application ID. For example, on the basis of the application ID and date information that are acquired at step S31 and the application ID and the date information that are accumulated as log information in the log information storage unit 2105, the content distribution site 210 can calculate the time that has elapsed after the previous access with the application ID.

When the content distribution site 210 determines that the given time has elapsed after the previous access at step S33, the content distribution site 210 cancels the restriction on entry with the application ID and shifts the processing to step S34.

When the content distribution site 210 determines that the given time has not elapsed after the previous access at step S33, the content distribution site 210 shifts the processing to step S35 and transmits a message indicating that entry with the application ID falls under restriction to the terminal device 20. The processing is then shifted to step S36.

At step S36, the content distribution site 210 determines whether or not the campaign satisfies a given condition. For example, when the campaign takes place for a given time period, the content distribution site 210 determines whether or not the current date is the date when the campaign ends. When it is determined that the campaign does not satisfy the given condition, the processing is returned to step S30. In contrast, when it is determined that the campaign satisfies the given condition, the content distribution site 210 shifts the processing to step S37 and transmits a given message indicating that fact to the terminal device 20.

Fourth Application Example of Third Embodiment

A fourth application example for the third embodiment will be described here. The system configuration illustrated in FIG. 18 can be used for the fourth application example.

In the fourth application example, when predetermined multiple objects are acquired with one application ID, specific content is presented. For the application example, a stamp rally can be assumed where a participant can be given with a reward by visiting all given points.

For example, there are Stations A to E and Stations A, B, C, and E are provided with stamps Stmp 600 to 603, respectively. A participant can be given with a reward by collecting imprints of all of the stamps Stmp 600 to 603. Participants in the stamp rally go to the stations provided with the stamps from among Stations A to E and record stamp imprints in a form etc. Imprints of the stamps Stmp 600 to 603 may be recorded in an arbitrary order. When a user completes recording all imprints of the stamps Stmp 600 to 603 and brings the form with the recorded imprints to a reception of the stamp rally etc., a reward is given.

Figure 21:
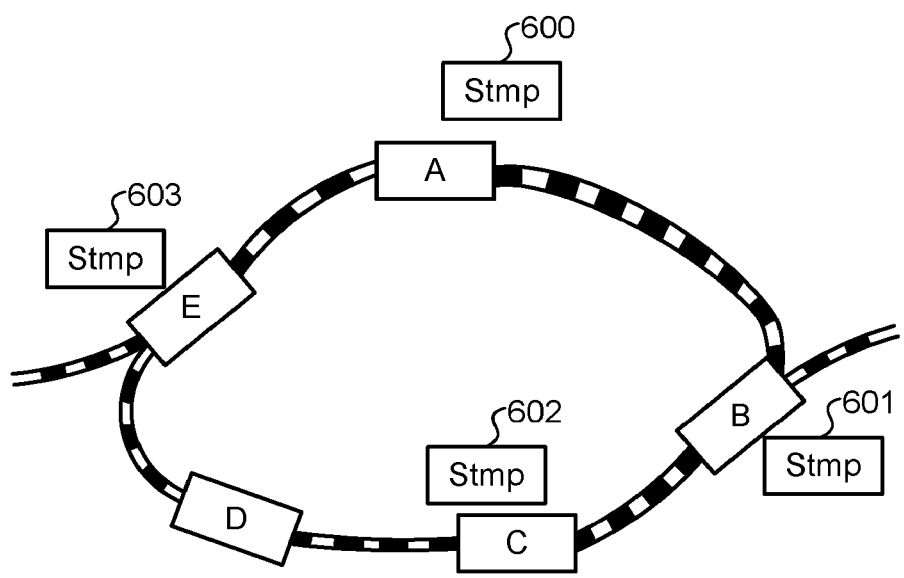
FIG. 21 is a diagram illustrating a fourth application example of the third embodiment.
Figure 22:
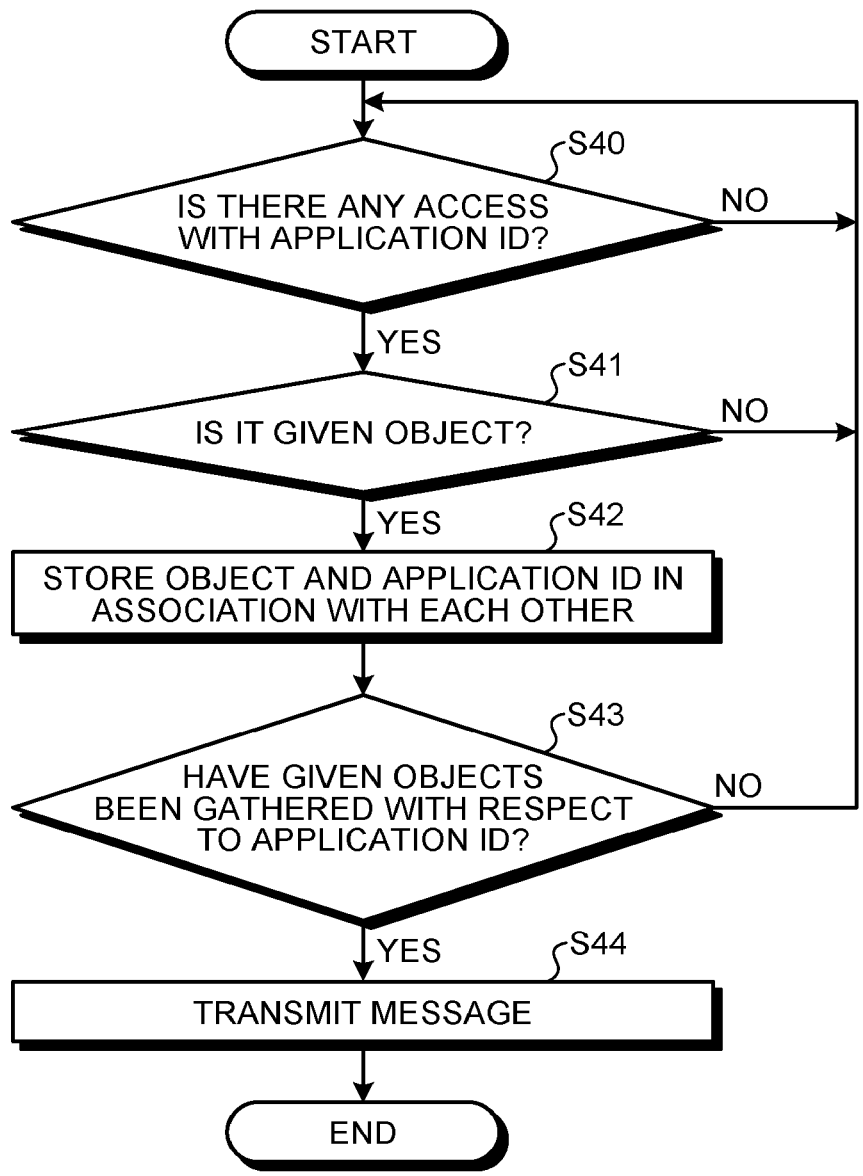
FIG. 22 is a flowchart of exemplary processes performed for a content distribution site according to the fourth application example.

FIG. 22 is a flowchart of exemplary processes performed by the content distribution site 210 according to the fourth application example. The fourth application example will be described with the stamp rally described with FIG. 21. The flowchart of FIG. 22 represents the processes to be performed with respect to one application ID that has been already registered in the content distribution site 210.

Prior to the processes of the flowchart of FIG. 22, the medium planning system 220 forms an imprint of each of Stamps Stmp 600 to 603 on a given medium, such as a paper medium, thereby creating each medium 510 corresponding to each of Stamps Stmp 600 to 603. The authoring data registration system 503 of the medium planning system 220 regards the imprints of Stamps Stmp 600 to 603 as objects and registers, in the DB 12, the objects in association with URLs #1 to #4 obtained by adding arguments different with one another and serving as object identifiers to the same URL (the URL of the content distribution site 210).

The content distribution site 210 also associates URLs different from one another and corresponding to the respective objects, which are the imprints of Stamps Stmp 600 to 603, with the URLs #1 to #4 with the added arguments. For example, when access to the content distribution site 210 is made with URL #1, this access is redirected to the URL associated with the stamp Stmp 600.

The content distribution site 210 waits access of the terminal device 20 (stpe S40).

The terminal device 20 captures an image of the medium 510 (an imprint of each of the stamps Stmp 600 to 603) at any one of Stations A, B, and C and transmits the captured image and the application ID to the image search system 200C. On the basis of the captured image transmitted from the terminal device 20, the image search system 200C searches the DB 12 for the URL associated with the captured image. For example, when the captured image transmitted from the terminal device 20 includes an object that is an imprint of the stamp Stmp 600, the image search system 200C searches the DB 12 for the URL #1 associated with the object. The image search system 200C transmits the application ID, the object ID acquired by the search performed by the image search server 11, and information on the date when the terminal device 20 accessed the image search system 200C in association with one another to the log server 14 to accumulate them as log information.

The terminal device 20 accesses the content distribution site 210 according to the URL transmitted from the image search system 200C and transmits the application ID to the content distribution site 210. Upon detecting the access of the terminal device 20 with the application ID, the content distribution site 210 shifts the processing to step S41 and determines which object, i.e., which one of imprints of the stamps Stmp 600 to 603, corresponds to the access with the application ID.

In this example, each of the URLs to be registered in the DB 12 of the image search system 200C has an argument added as an object identifier that identifies the object that is an imprint of any one of the stamps Stmp 600 to 603. On the basis of the arguments, the content distribution site 210 can determine whether or not the access with an application ID corresponds to a given object. When the content distribution site 210 determines that the access does not correspond to a given object, the content distribution site 210 returns the processing to step S40.

In contrast, when it is determined that the access corresponds to a given object, the processing is shifted to step S42. At step S42, the content distribution site 210 stores the object (object identifier) and the application ID in association with each other.

At step S43, on the basis of the information on the object stored at step S42, the content distribution site 210 determines whether all of the predetermined given objects have been gathered with respect to the application ID with which the access is made at step S40. In this example, the content distribution site determines, with respect to the application ID, whether or not the object identifiers of the objects corresponding to the stamps Stmp 600 to 603 have been gathered. When it is determined that not all of the object identifiers have been gathered, the process is shifted to step S40.

In contrast, when the content distribution site 210 determines, with respect to the application ID, that all of the object identifiers of the objects corresponding to the stamps Stmp 600 to 603 have been gathered, the content distribution site 210 shifts the processing to step S44 and transmits a message indicating that collecting of the given objects have completed to the terminal device 20 corresponding to the application ID.

It has been described that imprints of the stamps Stmp 600 to 603 are different from one another, but embodiments are not limited to this example. For example, imprints of the stamps Stmp 600 to 603 may be all the same and positional information on the terminal device 20 may be used to determine which image of imprints of the stamps Stmp 600 to 603 is captured.

Specifically, the terminal device 20 is further provided with a GPS unit that receives a GPS signal to perform positioning. When accessing the content distribution site 210 according to the URL corresponding to the captured image, the terminal device 20 transmits the result of positioning (e.g. the latitude and longitude) to the content distribution site 210. On the basis of the transmitted positioning result and the positional information on each of the stamps Stmp 600 to 603, the content distribution site 210 can determine at which one of the positions of the stamps Stmp 600 to 603 the terminal device 20 made an access.

In this example, after collecting the imprints of the given stamps, the user can give a notification indicating that the collecting has completed without visiting a reception site, etc.

It has been described that it is determined whether all of the predetermined given objects have been gathered at step S43 and, when not all of the given objects have been gathered, the processing is returned to step S40. However, embodiments are not limited to this. For example, when the given objects have not been gathered at step S43, it may be determined how many objects have been gathered and transmit a message corresponding to the number of objects. For example, when it is necessary to gather four objects to complete the collecting and if one object has been gathered, a message that indicates the current state, i.e., a message indicating that it is necessary to gather three more remaining objects, may be transmitted.

Fifth Application Example of Third Embodiment

A fifth application example of the third embodiment will be described here. The system configuration illustrated in FIG. 18 can be used for the fifth application example.

In the fifth application example, when predetermined multiple objects are acquired with one application ID in a predetermined order, a specific content is presented. For the application example, orientating can be assumed where all given points are visited in a given order to reach the final destination.

Figure 23:
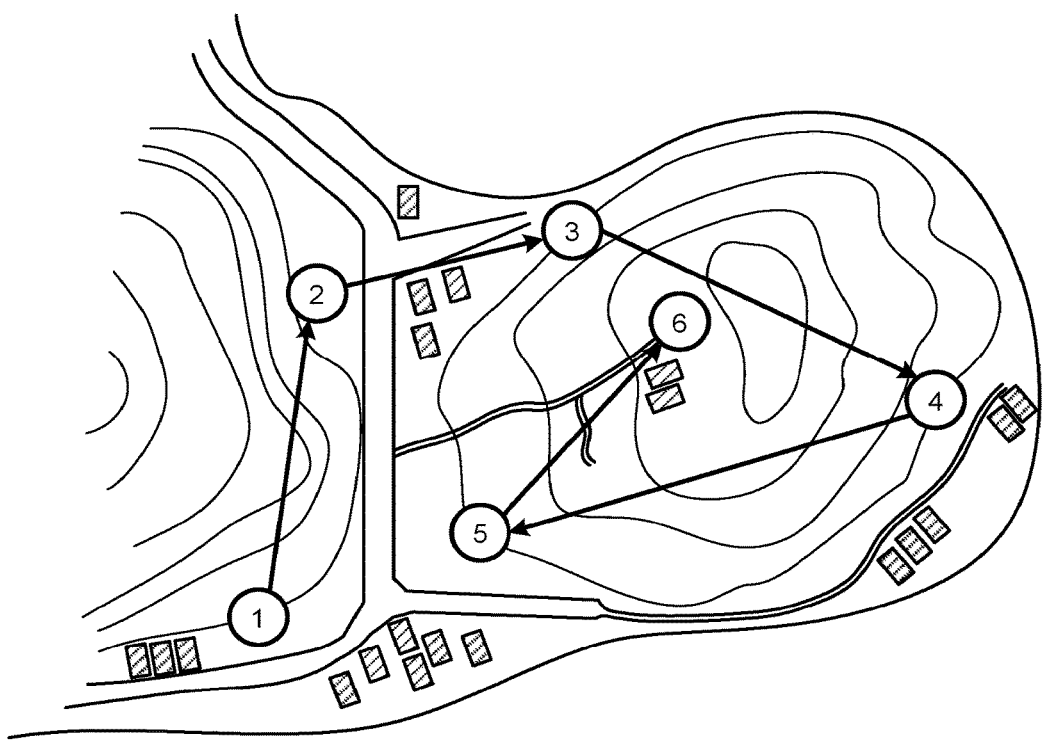
FIG. 23 is a diagram of an exemplary map used for orientating.

FIG. 23 is an exemplary map used for orientating. This map is distributed before the start of orientating to each participant who participates in orientating or each group of participants. The points to be passed are denoted with numbers indicating the order in which the points should be passed. The example of FIG. 23 indicates that participants should start from Point "1" and pass Points "2" to "5" in order and reach Point "6" that is the final destination. Control flags indicating Points "1" to "6" are disposed in the respective points such that participant can know that they have reached Points "1" to "6". Participants perform checking at each of Points "1" to "6" and, for example, after reaching Point "6" that is the final destination, prove that they have passed each of the points in order on the basis of the checking.

Figure 24:
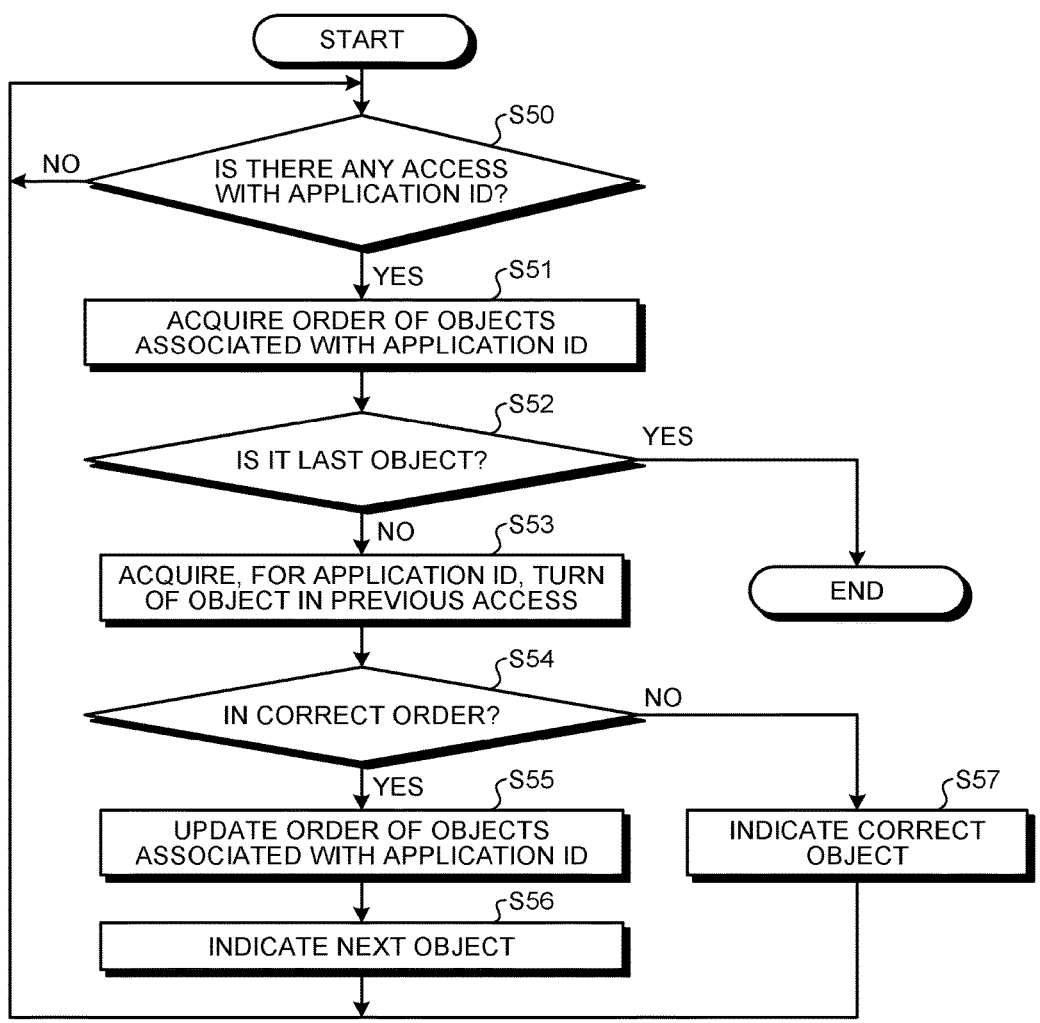
FIG. 24 is a flowchart of exemplary processes performed by a content distribution site according to a fifth application example of the third embodiment.

FIG. 24 is a flowchart of exemplary processes performed by the content distribution site 210 according to the fifth application example. The fifth application example will be described with the orientating described with FIG. 23. The flowchart of FIG. 24 represents the processes to be performed with respect to one application ID that has been already registered in the content distribution site 210.

Prior to the processes of the flowchart of FIG. 24, for example, the medium planning system 220 creates, as the medium 510, a control flag on which an image different for each of Points "1" to "6" is printed. The authoring data registration system 503 of the medium planning system 220 regards images of control flags of Points "1" to "6" as objects and registers, in the DB 12, the objects in association with URLs #1 to #6 obtained by adding arguments each indicating the turn of each Points "1" to "6" and serving as an object identifier to the same URL (the URL of the content distribution site 210).

The content distribution site 210 also associates URLs different from one another and for respective objects, which correspond to Points "1" to "6", with the URLs #1 to #6 with the added arguments. For example, when access to the content distribution site 210 is made with URL #1, this access is redirected to the URL associated with the object corresponding to Point "1".

The content distribution site 210 waits access of the terminal device 20 with one application ID that has been registered (step S50). It is assumed that the user of the terminal device 20 (participant) has started the place of Point "1", passed the place of Point "2", and have reached the place of Point "3".

The terminal device 20 captures an image of the medium 510 (control flag) at Point "3" and transmits the captured image and the application ID to the image search system 200C. On the basis of the captured image transmitted from the terminal device 20, the image search system 200C searches the DB 12 for the URL that is associated with the captured image. For example, when the captured image transmitted from the terminal device 20 includes an object that is the control flag of Point "3", the image search system 200C searches the DB 12 for the URL #3 associated with the object. The image search system 200C transmits, to the log server 14, the application ID, the object ID acquired by the searching performed by the image search server 11, and information on the date when the terminal device 20 accessed the image search system 200C in association one another to accumulate them as log information.

The terminal device 20 accesses the content distribution site 210 according to the URL #3 that is transmitted from the image search system 200C and transmits the application ID to the content distribution site 210. Upon detecting the access of the terminal device 20 with the application ID, the content distribution site 210 shifts the processing to step S51. At step S51, on the basis of the argument of the URL with which the terminal device 20 made an access, the content distribution site 210 acquires, as the order of objects associated with the application ID, the turn of the object (control flag) included in the captured image captured by the terminal device 20 among those of Points "1" to "6" and stores the turn.

At step S52, it is determined whether or not the acquired turn indicates the last object among those of Points "1" to "6". When it is determined that the turn indicates the last object, the series of processes of the flowchart of FIG. 24 with respect to the application ID complete. The content distribution site 210 may notify the terminal device 20 of a message indicating the fact.

When it is determined at step S52 that the turn does not indicate the last object from among those of Points "1" to "6", the content distribution site 210 shifts the processing to step S53 and acquires, for the application ID, the turn stored when the previous access was made at step S51. At step S54, the turn acquired in the previous access and the turn acquired in the current access are compared with each other and it is determined whether or not each point is passed in a correct order. For example, when the captured image includes the object that is the control flag of Point "3", it is determined whether or not the objects corresponding to Points "1" and "2", which are all of the points whose objects have to be acquired Prior to the object of Point "3", have been stored as log information.

Upon determining that each point has been passed in a correct order as a result of the determination, the content distribution site 210 shifts the processing to step S55 and updates the order of objects associated with the application ID.

The processing is then shifted to step S56 where the content distribution site 210 transmits, to the terminal device 20, information indicating the next object according to the updated order of objects. The information indicating the next object may be information simply indicating the turn. Alternatively, the content distribution site 210 may previously store images of objects of Points "1" to "6" and transmit the image corresponding to the next object to the terminal device 20. The processing is then returned to step S50.

When, each point has not been passed in a correct order according to the result of the determination at step S54, the processing is shifted to step S57. At step S57, the content distribution site 210 transmits information indicating a correct order of objects to the terminal device 20. The processing is then returned to step S50.

It has been described that each participant has a map made with a paper medium, etc. and the content distribution site 210 notifies the terminal device 20 of whether or not each of Points "1" to "6" has been passed in the correct order. However, embodiments are not limited to this. For example, the content distribution site 210 may transmit a map as map data to the terminal device 20 of each participant.

For example, for orientating, the content distribution site 210 distributes map data to the terminal device 20 of each participant. The map data distributed to the terminal device 20 displays only Point "1" that is the starting point. The content distribution site 210 acquires the order of objects corresponding to Points "1" to "6" according to the flowchart of FIG. 24 and, when the content distribution site 210 determines that each of Points "1" to "6" has been passed in a correct order at step S54, represents the position of the next point to be passed (step S56). When it is determined that each of Points "1" to "6" has been passed in an incorrect order at step S54, the position of the correct point to be passed is represented (step S57).

Furthermore, it has been described that, on the basis of the captured image of the control flag disposed in each of Points "1" to "6", it is determined at which one of Points "1" to "6" the terminal device 20 corresponding to the application ID is. However, embodiments are not limited to this example. For example, the current position of the terminal device 20 corresponding to the application ID may be determined with positional information on the terminal device 20.

Specifically, the terminal device 20 is further provided with a GPS unit that receives a GPS signal to perform positioning. When accessing the content distribution site 210 according to the URL corresponding to a captured image, the terminal device 20 transmits the result of positioning to the content distribution site 210. On the basis of the transmitted positioning result and pre-registered positional information on each of Points "1" to "6", the content distribution site 210 can determine at which one of Points "1" to "6" the access of the terminal device 20 corresponding to the application ID was made.

For the above-described embodiments, paper medium is described as an exemplary search target (image capturing target) medium. Alternatively, electronic paper, electronic bulletin board, etc. may be used.

As described above, for the system for carrying out the invention, an information processing system can be used where a terminal device and an image search system configured with at least one information processing device (an image search server or a log server) are connected to each other via a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system, comprising:
an image search system which performs an image search function, the image search system including at least one information processing device;
at least one other system including at least one information processing device, the at least one information processing device to be operated by at least one operator;
a terminal device storing a search program which uses the image search function of the image search system, wherein:
the at least one information processing device of the image search system including:
at least one first memory to store an object and linkage information in association with each other according to a request from the at least one operator;
a receiver configured to receive an obtained image, identification information and an image search request,
a transmitter configured to transmit, based on an object included in the obtained image, the linkage information associated with the object to a source from which the obtained image is transmitted, and
a first accumulator configured to accumulate, in response to a use of the image search function, log information including at least the received identification information in the first memory,
the terminal device comprising;
a second memory configured to store the search program,
a processor, by executing the search program, configured to:
acquire the identification information that identifies each terminal device that uses the image search system and corresponds to the search program of the terminal device,
obtain an image of a subject and output the obtained image;
transmit the obtained image, which is output by the capturing, the identification information and the image search request to the image search system;
receive the linkage information that is transmitted from the image search system in response to the image search request of the obtained image; and
transmit, when an access to the another system is made via the network based on the received linkage information, the identification information to the another system.

2. The information processing system according to claim 1, wherein at least one of the at least another system comprises;
at least one third memory to store content and the identification information; and
at least one processor configured to:
determine whether the identification information transmitted from the terminal device is stored in the third memory, and
present the content to the terminal device based on a result of the determination.

3. The information processing system according to claim 1, wherein:
at least one of the at least one of the another system comprises;
at least one third memory configured to store contents of learning material and user information according to a level of at least one learner,
at least one processor configured to:
determine whether the access of the terminal device is by one of the at least one learner registered in the third memory, and
present the content to the terminal device based on a result of the determination, and
the processor of the terminal device is configured to obtain the image of the subject from the learning material.

4. The information processing system according to claim 1, wherein:
at least one of the at least one another systems comprises:
at least one third memory to store content and log information including at least the identification information and date information of the access;
at least one processor configured to:
determine whether a number of the access to entry for a campaign by one terminal device in a predetermined period is more than a predetermined number based on the transmitted identification information and the log information;
present the content for entry for the campaign to the terminal device based on a result of the determination; and
accumulate, in response to the access to entry for the campaign, log information of the transmitted identification information in the third memory, and
the processor of the terminal device is configured to obtain the image of the subject from an application form for the campaign.

5. The information processing system according to claim 1, wherein at least one of the at least another system comprises:

at least one processor configured to provide a stamp rally service based on the identification information.

6. The information processing system according to claim 1, wherein at least one of the at least another system comprises:
at least one processor configured to provide a service which is restricted based on a number of times a same identification information is utilized within a period of time.

7. The method according to claim 1, further comprising:
restricting a service based on a number of times a same identification information is utilized within a period of time.

8. A method of communicating by a terminal, comprising:
transmitting, by the terminal, identification information that identifies the terminal and an image related to a search to an image search device;
receiving, by the terminal, linkage information transmitted from the image search device; and
transmitting, by the terminal, the identification information that identifies the terminal to another device which is different from the image search device, based on the linkage information which has been received.

9. The method according to claim 8, further comprising:
receiving by the terminal from the another device content, depending on whether the another device stores information corresponding to the identification information that identifies the terminal.

10. The method according to claim 8, further comprising:
receiving by the terminal from the another device learning material which corresponding to a level of at least one learner;
obtaining, by the terminal, an image of a subject from the learning material.

11. The method according to claim 8, further comprising:
determining, by the another device, whether a number of accesses to entry for a campaign in a predetermined time period is more than a predetermined number based on the identification information that identifies the terminal which has been transmitted by the terminal;
receiving, by the terminal, content, transmitted by the another device, related to the campaign, based on a resulting of the determining; and
storing by the another device information corresponding to the access to the entry for the campaign.

12. The method according to claim 8, further comprising:
providing a stamp rally service based on the identification information.

13. A terminal device comprising:
a memory to store a search program which includes an image search function to be performed by an image search system;
a processor, configured to execute the search program, and perform:
acquiring identification information that identifies the terminal device that uses the image search system and corresponds to the search program of the terminal device;
obtaining an image of a subject;
transmitting the image which has been obtained, the identification information, and an image search request to the image search system,
receiving linkage information that is transmitted from the image search system in response to the image search request of the obtained image, the linkage information being associated with an object included in the image which has been obtained, and
transmitting the linkage information to a device, different from the image search system, after the linkage information is received from the image search system.

14. The terminal device according to claim 13, wherein the processor is further configured to:
present content information based on a result of a determination which utilizes identification information.

15. The terminal device according to claim 13, wherein the processor is further configured to:
obtain the image of the subject from learning material.

16. The terminal device according to claim 13, wherein the processor is further configured to:
obtain the image of the subject from an application form for a campaign.

17. The terminal device according to claim 13, wherein the processor is further configured to:
obtain a stamp rally service based on the identification information.

18. The terminal device according to claim 13, wherein the processor is further configured to:
receive a service which is restricted based on a number of times a same identification information is utilized within a period of time.

* * * * *